US010754504B2

(12) United States Patent
Singh et al.

(10) Patent No.: US 10,754,504 B2
(45) Date of Patent: Aug. 25, 2020

(54) SCREEN GRAB METHOD IN ELECTRONIC DEVICE

(71) Applicant: Samsung Electronics Co., Ltd., Suwon-si, Gyeonggi-do (KR)

(72) Inventors: Gurveer Singh, Delhi (IN); Ritesh Sinha, Koderma (IN); Achintya Dixit, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 15/257,088

(22) Filed: Sep. 6, 2016

(65) Prior Publication Data

US 2017/0083182 A1   Mar. 23, 2017

(30) Foreign Application Priority Data

Sep. 22, 2015   (IN) ............. 3007/DEL/2015
Dec. 2, 2015    (IN) ............. 3007/DEL/2015

(51) Int. Cl.
| | |
|---|---|
| *G06F 3/0482* | (2013.01) |
| *G06F 9/451* | (2018.01) |
| *G06F 3/0488* | (2013.01) |
| *G06F 3/0484* | (2013.01) |
| *G06F 17/00* | (2019.01) |

(52) U.S. Cl.
CPC ............ *G06F 3/0482* (2013.01); *G06F 9/451* (2018.02); *G06F 3/0488* (2013.01); *G06F 3/04842* (2013.01); *G06F 3/04883* (2013.01)

(58) Field of Classification Search
CPC .. G06F 3/0482; G06F 3/04883; G06F 3/0488; G06F 3/04842; G06F 17/214
See application file for complete search history.

(56) References Cited

U.S. PATENT DOCUMENTS

| | | |
|---|---|---|
| 2002/0085017 A1 | 7/2002 | Pisutha-Arnond et al. |
| 2007/0273664 A1 | 11/2007 | Kim et al. |
| 2007/0273668 A1 | 11/2007 | Park et al. |
| 2009/0193345 A1* | 7/2009 | Wensley ............. H04L 65/4015 715/756 |
| 2009/0276547 A1 | 11/2009 | Rosenblatt et al. |

(Continued)

FOREIGN PATENT DOCUMENTS

| | | |
|---|---|---|
| KR | 10-2011-0137041 A | 12/2011 |
| WO | 02/054712 A2 | 7/2002 |

(Continued)

OTHER PUBLICATIONS

European Office Action dated Mar. 21, 2019, issued in European Patent Application No. 16 848 835. 1.

(Continued)

*Primary Examiner* — Quoc A Tran
(74) *Attorney, Agent, or Firm* — Jefferson IP Law, LLP

(57) ABSTRACT

A method for selecting multiple data items in an electronic device is provided. The method includes displaying a plurality of applications on a screen of the electronic device, each of the plurality of applications including at least one data item, activating a screen grab function in response to detecting a predetermined event, identifying the at least one data item of the plurality of applications, and displaying a list including the at least one data item of the plurality of applications on the screen.

13 Claims, 44 Drawing Sheets

(56) References Cited

U.S. PATENT DOCUMENTS

| | | | |
|---|---|---|---|
| 2009/0313567 A1* | 12/2009 | Kwon | G06F 3/0482 715/769 |
| 2010/0299599 A1* | 11/2010 | Shin | G06F 3/0482 715/702 |
| 2011/0310039 A1 | 12/2011 | Kim | |
| 2012/0110486 A1 | 5/2012 | Sirpal et al. | |
| 2012/0189203 A1 | 7/2012 | Lin et al. | |
| 2012/0249741 A1* | 10/2012 | Maciocci | G06F 3/011 348/46 |
| 2013/0108161 A1 | 5/2013 | Carr | |
| 2013/0225236 A1 | 8/2013 | Lee et al. | |
| 2013/0268894 A1* | 10/2013 | Jeon | G06F 3/04817 715/835 |
| 2014/0068484 A1* | 3/2014 | Hyun | G06F 3/0486 715/769 |
| 2014/0164966 A1* | 6/2014 | Kim | G06F 3/04886 715/769 |
| 2014/0229858 A1* | 8/2014 | Bleker | G06F 3/04883 715/753 |
| 2016/0274771 A1 | 9/2016 | Seong et al. | |
| 2017/0102975 A1* | 4/2017 | Rahardja | G06F 9/546 |

FOREIGN PATENT DOCUMENTS

| | | |
|---|---|---|
| WO | 2010/002497 A1 | 1/2010 |
| WO | 2012/044782 A1 | 4/2012 |
| WO | 2015/060470 A1 | 4/2015 |

OTHER PUBLICATIONS

Indian Office Action dated Jan. 17, 2020, issued in Indian Patent Application No. 3007/DEL/2015.

European Summoned to attend oral proceedings dated Mar. 17, 2020, issued in European Patent Application No. 16 848 835.1.

* cited by examiner

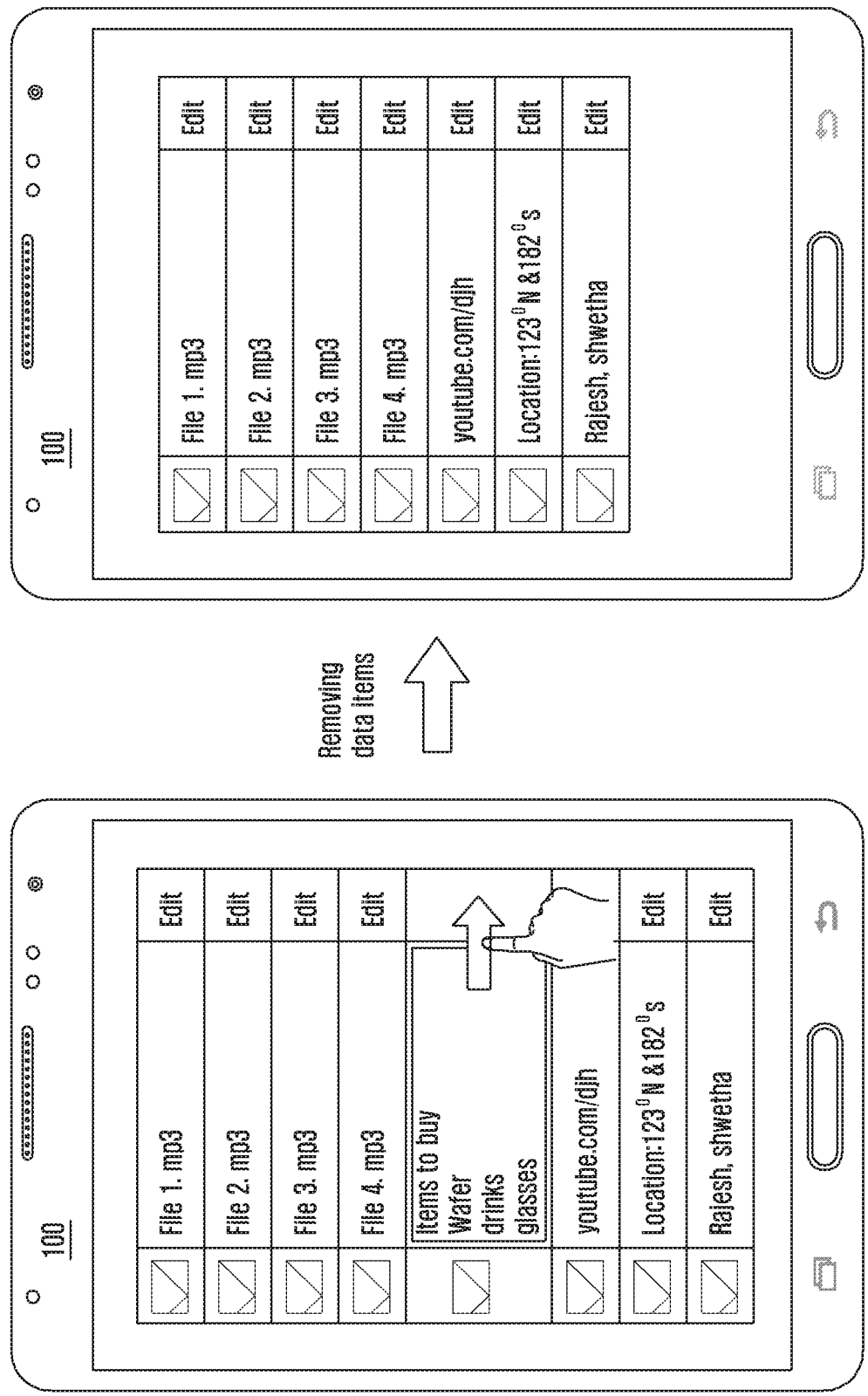

SCREEN GRAB METHOD IN ELECTRONIC DEVICE

CROSS-REFERENCE TO RELATED APPLICATION(S)

This application claims the benefit under 35 U.S.C. § 119(a) of an Indian Provisional patent application filed on Sep. 22, 2015 in the Indian Intellectual Property Office and assigned Serial number 3007/DEL/2015, and of an Indian Non-provisional patent application filed on Dec. 2, 2015 in the Indian Intellectual Property Office and assigned Serial number 3007/DEL/2015, the entire disclosure of which is hereby incorporated by reference.

TECHNICAL FIELD

The present disclosure relates to electronic devices. More particularly, the present disclosure relates to a screen grab method for multiple data items selection using a single operation in an electronic device.

BACKGROUND

Portable electronic devices (such as gaining devices, smart phones, tablets, phablets, media players, digital assistants, electronic book reader devices, or the like consumer electronic devices, wearable devices and so on) are becoming increasingly popular. It is generally known that the content present in various applications in the electronic devices can be shared through Bluetooth (BT), Wi-Fi, messenger or social media websites. The content in the applications has to be selected for sharing the selected content. For example, in a gallery application, image(s) has to be selected and the selected images are shared.

In order to share content distributed among multiple applications in the electronic device, the content has to be selected from each application. This requires a user to undergo an extensive number of operations. More particularly, when a large number of contents has to be shared then the user has to undergo multiple operations to separately select content in each application available at different locations which may become cumbersome and time consuming for the user thereby decreasing the overall user experience. Thus, there remains a need of robust and simple mechanism for selection of multiple contents in an electronic device, more particularly, selection of multiple contents from various locations.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mechanism for selecting multiple data items in an electronic device.

Another aspect of the present disclosure is to provide a mechanism for causing to display a plurality of applications on a screen of the electronic device. Each application displays one or more data items on the screen of the electronic device.

Another aspect of the present disclosure is to provide a mechanism for grabbing one or more data items from the plurality of applications displayed on the electronic device.

Another aspect of the present disclosure is to provide a mechanism that causes to display a data item selection list. The data item selection list includes the one or more data items displayed in each application.

Another aspect of the present disclosure is to provide a mechanism for performing one or more actions on the data item selection list.

Another aspect of the present disclosure is to provide a mechanism for grabbing the one or more data items displayed in each application based on a predefined criteria.

In accordance with an aspect of the present disclosure, a method for selecting multiple data items in an electronic device is provided. The method includes displaying a plurality of applications on a screen of the electronic device, each of the plurality of applications including at least one data item, activating a screen grab function in response to detecting a predetermined event, and displaying a list including the at least one data item of the plurality of applications on the screen.

In accordance with another aspect of the present disclosure, an electronic device is provided. The electronic device includes a display, and at least one processor configured to cause the display to display a plurality of applications on a screen of the electronic device, each of the plurality of applications including at least one data item, activate a screen grab function in response to detecting a predetermined event, identify the at least one data item of the plurality of applications, and cause the display to display a list including the at least one data item of the plurality of applications on the screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10B illustrates an action of removing data items in a data item selection list displayed on an electronic device according to an embodiment of the present disclosure;

Throughout the drawings, it should be noted that like reference numbers are used to depict the same or similar elements, features, and structures.

DETAILED DESCRIPTION

Figure 1A:
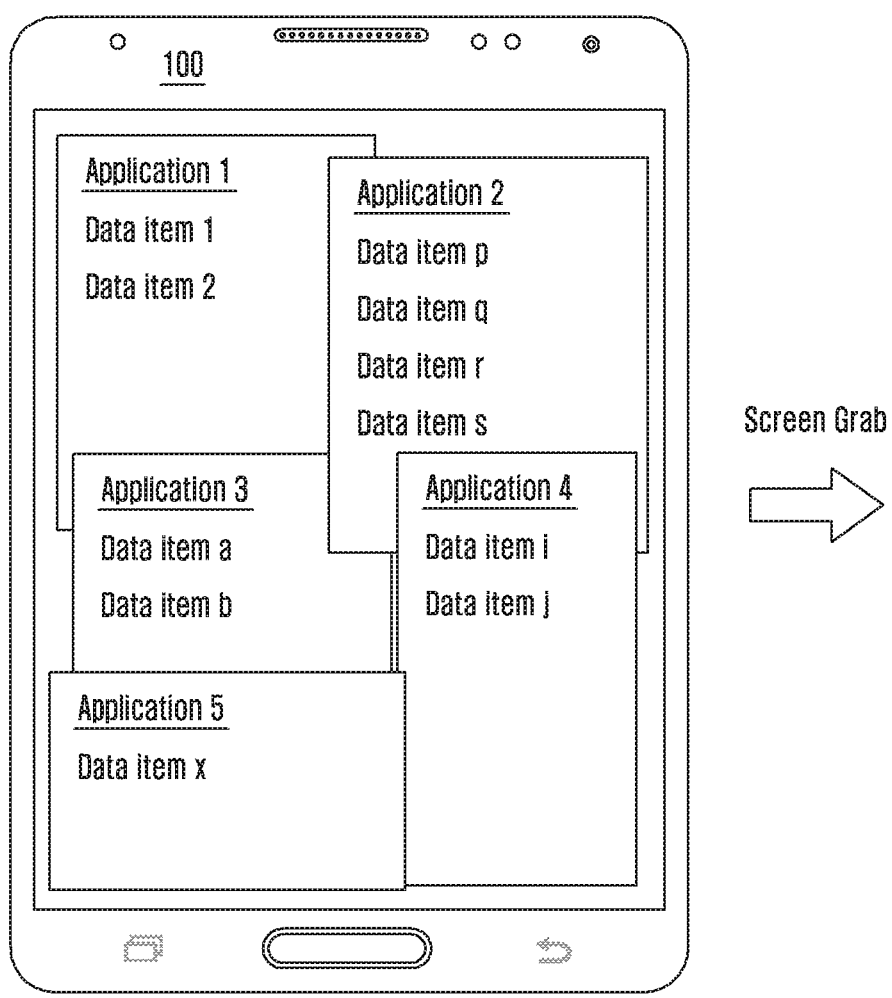
FIGS. 1A and 1B show an example scenario in which an electronic device displays a data item selection list having data items grabbed from each application displayed on the electronic device when a screen grab function is activated, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein achieve a method for selecting multiple data items in an electronic device. The method includes causing to display a plurality of applications on a screen of the electronic device. Each application displays at least one data item on the screen of the electronic device. Further, the method includes grabbing one or more data items displayed on the screen of the electronic device when a screen-grab function is activated. Furthermore, the method includes causing to display at least one data item selection list including the at least one data item displayed in each application.

In an embodiment, the data item selection list allows one or more actions to be performed on each of the data items.

In an embodiment, the action includes selecting the data items in the data item selection list, de-selecting the data items in the data item selection list, removing the data items in the data item selection list, adding the data items in the data item selection list, editing the data items in the data item selection list, prioritizing the data items in the data item selection list, previewing data items in the data item selection list, sharing the data items in the data item selection list, copying the data items in the data item selection list from one location to another location in the electronic device, shifting the data items in the data item selection list from one location to another location in the electronic device, opening the data items in the data item selection list using an application in the electronic device, grouping two or more data items in the data item selection list, and the like.

The embodiments herein achieve a method for selecting data items from a plurality of electronic devices. The method includes sending a screen grab request message to at least one second electronic device when a screen-grab function is activated on a first electronic device. Further, the method includes receiving at least one data item grabbed from at least one application displayed on the at least one second electronic device. Furthermore, the method includes causing to display a data item selection list comprising each of the data items received from the at least one second electronic device.

Unlike systems and methods according to the related art, the proposed method can be used for multiple data items selection using a single operation in the electronic device. By performing a single screen-grab function or event, the data item(s) from each application displayed on the screen of the electronic device can be grabbed. More particularly, consider a scenario in which a user views different applications in respective windows of a multi-window environment or mode. The screen-grab event or function according to the related art can be used not only to capture the screenshot of all the windows displayed on the electronic device, but also to grab the possible content each open application can provide. Generally, the content viewed by the user in the multiple windows is more important to the user rather than the hidden content. All of the content that the user is viewing at that moment is grabbed based on type and shown to the user in the form of a data item selection list, thus preventing a huge number of file selection operations and menu traversals.

In order to implement the proposed method, the electronic device should have basic functionality to trigger the screen grab function or event by means of keys combination, a palm gesture on the screen, a hover gesture, a rail gesture, and the like. The electronic device should also have a selection and communication mechanism for retrieving data items from various applications and displaying them on the screen of the electronic device. The data item selection list including the retrieved data items are subjected to various actions as described thereon.

Instead of performing multiple operations for selecting multiple data items, the proposed method can be used to select multiple data items using a single operation. More particularly, in scenarios where the user views content related to an event in multiple applications, the proposed system and method can be used to provide a quick multiple content selection using a single screen-grab operation. For example, consider a scenario, in which the user is viewing music files in a music player application, images in gallery application, a notes application, and YouTube™ videos in a YouTube™ application. Now consider a scenario that the user wishes to share these data items with a friend who has similar interest. With the methods according to the related art, the user has to go to the music player application to select the desired music files to be shared. In case of the gallery application, the images being displayed in the gallery application has two options of selection. With one user event, the user can select single image or all the images in the gallery application. Even if the user has to select multiple images from the images currently displayed on the screen (without scrolling), user has to individually perform action on each image to be selected. In case of the notes application, the user has to open each note and individually select the data items and then maintain the copied data items in a new note. Further, in case of the YouTube™ application, the user has to copy a uniform resource locator (URL) and then share the URL of the video to be shared. In this case, if the user intends to share some other links, then each link has to be selected separately. Thus, the methods according to the related art require the user to undergo extensive number of operations for selecting the data items distributed in various applications.

Unlike systems and methods according to the related art, the proposed method can be used to grab the information displayed in each application window. The user can perform a single screen grab even to generate a data item selection. While viewing the above applications in a multi-window environment, the user can perform the screen-grab while the data items the user is viewing at that moment is grabbed and displayed to the user in the form of a data item selection list. Thus, preventing a huge number of file selection operations and menu traversals. For example, when the user performs the screen-grab function, the music files displayed in the music player are grabbed, the images in the galley application are selected, the data items from different notes being displayed are selected, and a URL of the video from the YouTube™ application is grabbed. The user can perform various actions such as but not limited to selecting or de-selecting the data items displayed in the data items selection list.

The proposed method allows the user to simultaneously select the data items (currently being viewed by the user) using the screen-grab operation. It is assumed that the data items which are viewed by the user on the screen of the electronic device are important or likable to the user than the data items which are hidden. Thus, the chances for sharing the data being shown to the user are higher than all the data items provided in the applications. Also, the user can view preferred data items in multiple windows, each with separate activity. By performing the screen-grab, the data items which are currently viewable on the screen are displayed in the data item selection list, which the user can easily share with other connected devices.

An application of the proposed method can include sharing of multiple music files in a playlist using a single operation. Whereas, in methods and systems according to the related art, in order to share multiple music files, each music file has to be individually selected thereby decreasing the overall user experience. Similarly, the other application can include grabbing content from different applications using a single operation while browsing, planning an event, working on a project, collaborative browsing, and the like.

Further, a person having ordinary skill in art understands that the proposed method can be extended to grab multiple data items from different electronic devices connected together in a network. The electronic devices are connected together forming a network in which one among the electronic devices acts as a master electronic device and remaining electronic devices act as slave electronic devices. For example, one or more slave electronic devices connected to a master electronic device. In order to perform the screen-grab operation on slave electronic devices, the master electronic device sends a screen-grab request message to the multiple electronic devices. The slave electronic devices perform the screen-grab operation, in response to the screen-grab request message received from the electronic device. Further, each of the slave electronic devices (which receives the screen-grab request message) generates a data item selection list after receiving the screen-grab request message and sends each data item selection list to the master electronic device. The master electronic device receives the data item selection list from each of the slave electronic devices and generates a combined data item selection list. Thus, the proposed method allows the user to simultaneously select the data items (currently being viewed by the user) on individual electronic devices using the screen-grab operation.

More particularly, in scenarios where different users view content related to an event on their individual electronic devices, the proposed system and method can be used to grab the data item from applications displayed on each of the electronic devices for quick multiple content selection using a single screen-grab operation. The methods according to the related art require the user to undergo extensive number of operations for selecting the data items distributed in various applications on different electronic devices in such scenarios. All the data items that is displayed on each of the electronic devices at that moment is grabbed and displayed in the form of a data item selection list on a master electronic device. Thus, preventing a huge number of file selection operations and menu traversals.

Throughout the description, the terms screen-grab operation and screen-grab function will have the same meaning.

Referring now to the drawings where similar reference characters denote corresponding features consistently throughout the figures, there are shown preferred embodiments.

Figure 1B:
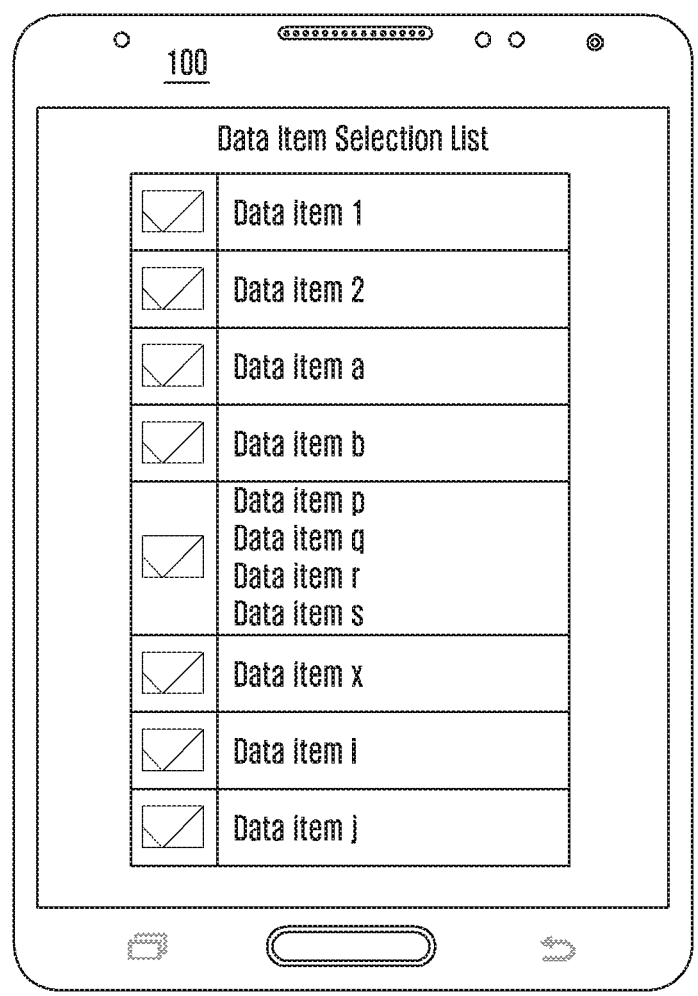

FIGS. 1A and 1B show an example scenario in which an electronic device displays a data item selection list having data items grabbed from each application displayed on the electronic device when a screen grab function is activated according to various embodiments of the present disclosure.

Referring to FIG. 1A, the plurality of applications, namely application 1, application 2, application 3, application 4 and application 5, are displayed on the screen of the electronic device 100. According to an embodiment of the present disclosure, a screen of the electronic device may include a plurality of windows, and each of the plurality of applications may be displayed in each window. At least a portion of the each window may be overlapped each other. Each application displays the data items present in the application. In an embodiment, the data items can be selected from each application displayed on the screen of the electronic device 100 using a single-grab operation. In other words, the screen grab function can be activated in response to detecting a predetermined event (for example, the single-grab operation). For example, the user can perform a single screen-grab as an operation to grab all the data items from each application displayed on the electronic device 100. The screen grab operation described herein may, non-exclusively, refer to a mechanism for taking a screen shot of the screen of the electronic device 100 when a screen grab function is activated by means of a key combination, a palm gesture on the screen of the electronic device 100, a hover gesture, a rail gesture, and the like. In other words, the screen grab function can be activated, when a predetermined touch or hover gesture is received (for example, grabbing gesture of plurality of applications) or a predetermined button is selected. According to an embodiment of the present disclosure the screen grab function can be activated when a request of screen grab is received from at least one other electronic device.

When the screen-grab function is activated on the electronic device 100, the data items of each application displayed on the electronic device 100 are grabbed. Unlike methods according to the related art, where each data item is selected individually from each application, with the proposed method, multiple data items displayed in each application can be selected by performing the screen-grab operation on the electronic device 100. Thus, the proposed method can reduce the number of operations performed for selecting multiple data items in various applications.

In an embodiment, a data item selection list is generated with data items grabbed from each application. The data item selection list is displayed on the screen of the electronic device 100 as shown in FIG. 1B. The data item selection list displays the data items grabbed from each application displayed on the electronic device.

It should be noted that, all the data items in the data item selection list are selected (by default, as shown with checkboxes in FIG. 1B).

In an embodiment, the one or more actions can be performed on the data item selection list displayed on the electronic device 100. In an embodiment, the action includes selecting the one or more data items in the data item selection list, de-selecting the one or more data items in the data item selection list, removing the one or more data items in the data item selection list, adding the one or more data items in the data item selection list, editing the one or more data items in the data item selection list, prioritizing the one or more data items in the data item selection list, previewing the one or more data items in the data item selection list, sharing the one or more data items in the data item selection list, copying the one or more data items in the data item selection list from one location to another location in the electronic device, shifting the one or more data items in the data item selection list from one location to another location in the electronic device, opening the one or more data items in the data item selection list using an application in the electronic device, grouping two or more data items in the data item selection list, or the like.

The one or more actions performed on the data item selection list are explained in conjunction with the figures in the later parts of the description.

Figure 2:
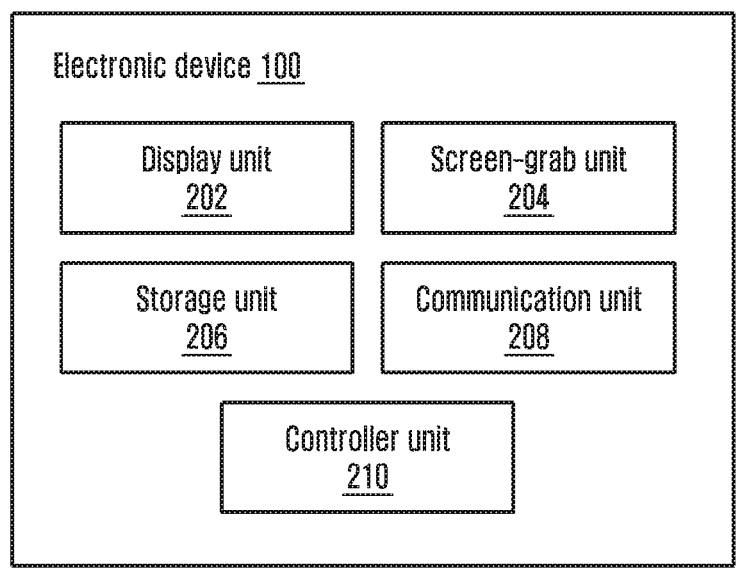
FIG. 2 illustrates various units of an electronic device for selection of data items according to an embodiment of the present disclosure.

FIG. 2 illustrates various units of an electronic device for selection of data items according to an embodiment of the present disclosure.

Referring to FIG. 2, the electronic device 100 includes a display unit 202, a screen-grab unit 204, a storage unit 206, a communication unit 208, and a controller unit 210.

Referring to FIG. 2, the display unit 202 can be configured to display the plurality of applications on the screen of the electronic device 100. In an embodiment, the screen-grab unit 204 can be configured to grab the one or more data items from the plurality of applications displayed on the screen of the electronic device 100. The screen-grab unit 204 can be configured to determine the screen-grab event performed on the electronic device 100. When the screen-grab event is performed, the screen-grab function is activated. For example, the screen-grab event may include receiving a predetermined input signal on the input device and/or receiving a request of screen grab from at least one another electronic device. The screen-grab unit 204 grabs the one or more data items from each application displayed on the electronic device 100 when the screen-grab function is activated. At least a portion of technical configuration of the screen-grab unit 204 may be implemented or performed by the controller unit 210.

The storage unit 206 can be configured to store the data item selection list which includes the one or more data items grabbed from the plurality of applications. The storage unit 206 may include one or more computer-readable storage media. The storage unit 206 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 106 may, in some examples, be considered a non-transitory storage medium. The term "non-transitory" may indicate that the storage medium is not embodied in a carrier wave or a propagated signal. However, the term "non-transitory" should not be interpreted that the storage unit 206 is non-movable. In some examples, the storage unit 206 can be configured to store larger amounts of information than the memory. In certain examples, a non-transitory storage medium may store data that can, over time, change (e.g., in random access memory (RAM) or cache). The storage unit 206 may store various instructions that can be performed by the controller unit 210.

In an embodiment, the communication unit 208 can be configured to send a data item selection list to an electronic device 100a. The communication unit 208 can be configured to send the data item selection list to the electronic device 100a or electronic device 100b using one or more communication means such as Bluetooth, Wi-Fi and the like.

In an embodiment, the controller unit 210 can be configured to cause to display the plurality of applications on the screen of the electronic device 100. The controller unit 210 can be configured to communicate with the display unit 202 in order to cause the display unit to display the plurality of applications on the screen of the electronic device 100. Further, the controller unit 210 can be configured to display the one or more data items selection list with the one or more data items displayed in each application. Furthermore, the controller unit 210 can be configured to communicate with the screen-grab unit 204 and the storage unit 206 for grabbing the data items displayed in each application. The controller unit 210 may include at least one processor. In an embodiment, controller unit 210 may be configured to load the instructions stored in the storage unit 206 and perform functions defined on the instructions.

FIG. 2 shows a limited overview of the electronic device 100 but, it is to be understood that other embodiments are not limited thereto. The labels or names of the units are used only for illustrative purposes and does not limit the scope of the present disclosure. Further, the electronic device 100 can include any number of units or sub-units communicating among each other along with the other components. Likewise, the functionalities of one or more units can be combined by a single unit or can be distributed among each other in a manner different than described herein without departing from the scope of the present disclosure.

In an embodiment, the electronic device 100 may include an input device. The input device may include a touch panel, a digital pen sensor, a key, or an ultrasonic input unit.

Figure 3:
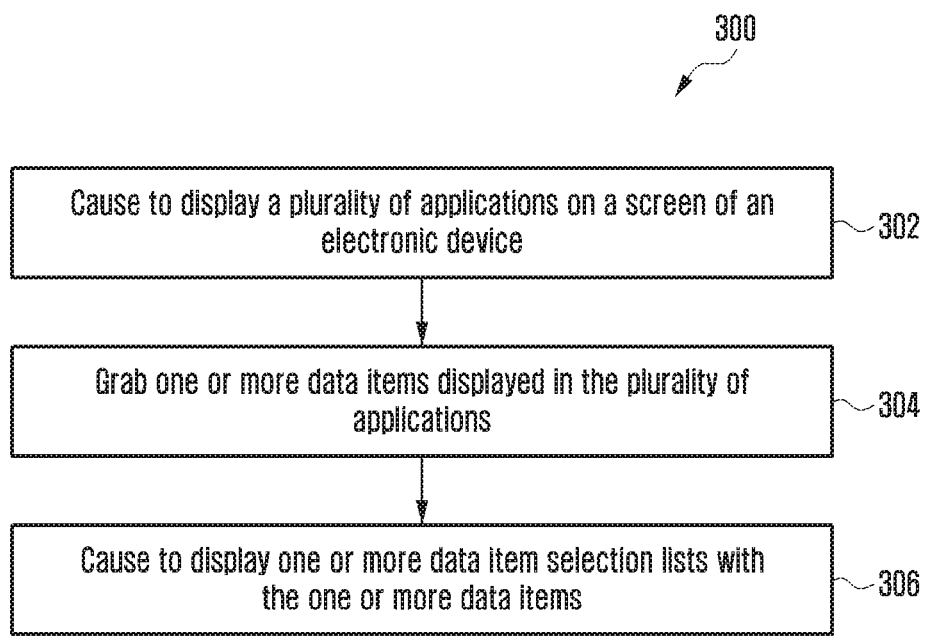
FIG. 3 is a flow chart illustrating a method for selecting data items in an electronic device according to an embodiment of the present disclosure.

FIG. 3 is a flow chart illustrating a method for selecting data items in the electronic device 100 according to an embodiment of the present disclosure.

Referring to FIG. 3, at operation 302, the method 300 includes causing to display the plurality of applications on the screen of the electronic device 100. The method 300 allows the controller unit 210 to cause to display the plurality of applications on the screen of the electronic device 100. The plurality of applications display the data items present in each application. In an embodiment, the electronic device 100 may be incapable of supporting a multi-window. In this case, the controller unit 210 may identify at least one application which launched recently. Then, the controller unit 210 re-launches the recently launched applications one by one, and identifies the data item sequentially.

After operation 302, the method 300 may include activating a screen grab function in response to detecting a predetermined event.

At operation 304, the method 300 includes grabbing the one or more data items displayed in the plurality of applications. In other words, the controller unit 210 may identify the at least one data item of the plurality of applications. The method 300 allows the screen-grab unit 204 to grab the one or more data items displayed in the plurality of applications. In an embodiment, the screen-grab unit 204 determines whether the screen-grab is performed on the electronic device 100. If the screen-grab unit 204 determines that the screen-grab is performed on the electronic device 100, then the screen garb-unit activates the screen-grab function. When the screen-grab function is activated, the screen-grab unit 204 grabs one or more data items displayed on the plurality of applications. At operation 306, the method 300 includes displaying one or more data item selection lists with the one or more data items. The data item selection list may include at least one data item of the plurality of applications displayed on the screen. The method 300 allows the controller unit 210 to cause to display one or more data item selection list with the one or more data items displayed in each application. In an embodiment, when there are no devices connected to the electronic device 100, then the electronic device 100 displays a single data item selection list. In an embodiment, when the electronic device 100 is connected with one or more electronic devices (such as 100a-100n), then the electronic device 100 receives a data item selection list from each of the electronic devices. Further, the electronic device 100 displays each data item selection list received from each of the electronic devices.

The various actions, acts, blocks, operations, or the like in the method 300 may be performed in the order presented, in a different order or simultaneously. Further, in some embodiments, some of the actions, acts, blocks, operations, or the like may be omitted, added, modified, skipped, or the like without departing from the scope of the present disclosure.

FIGS. 4A to 4D illustrate an example scenario in which a data item selection list having data items grabbed from each application is shared with another electronic device, according to various embodiments of the present disclosure.

Figure 4A:
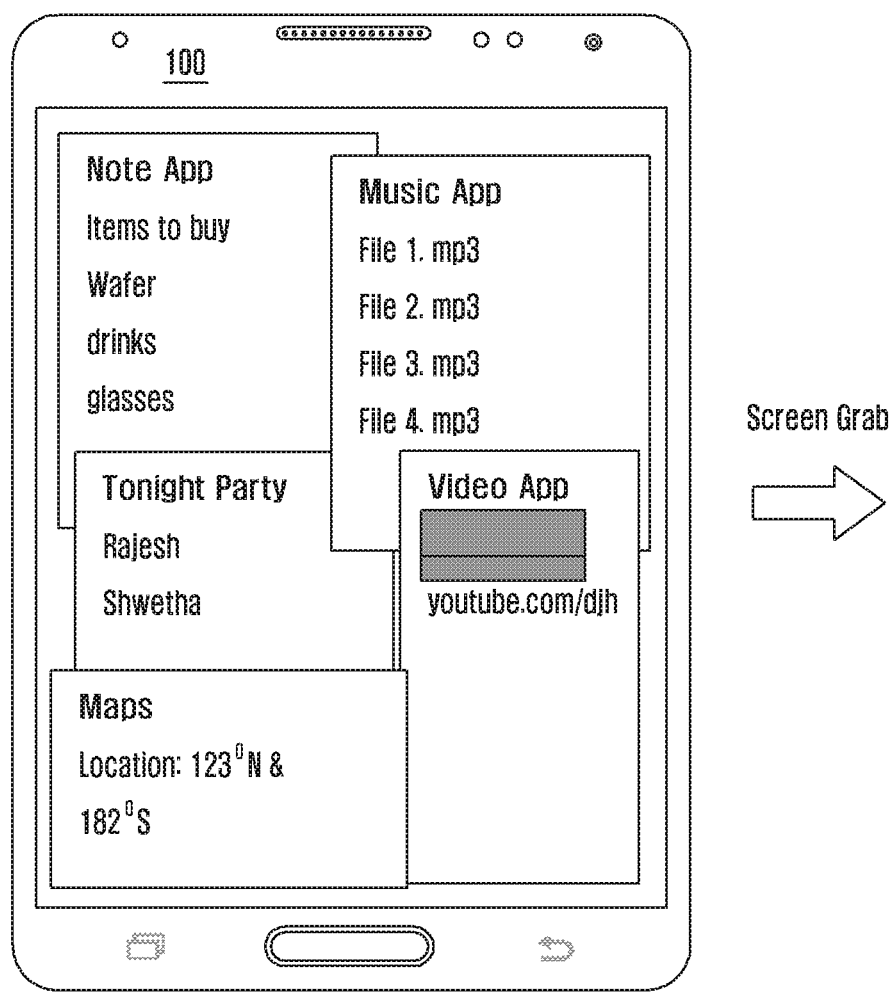
FIGS. 4A to 4D illustrate an example scenario in which a data item selection list having data items grabbed from each application is shared with another electronic device, according to various embodiments of the present disclosure.
Figure 4B:
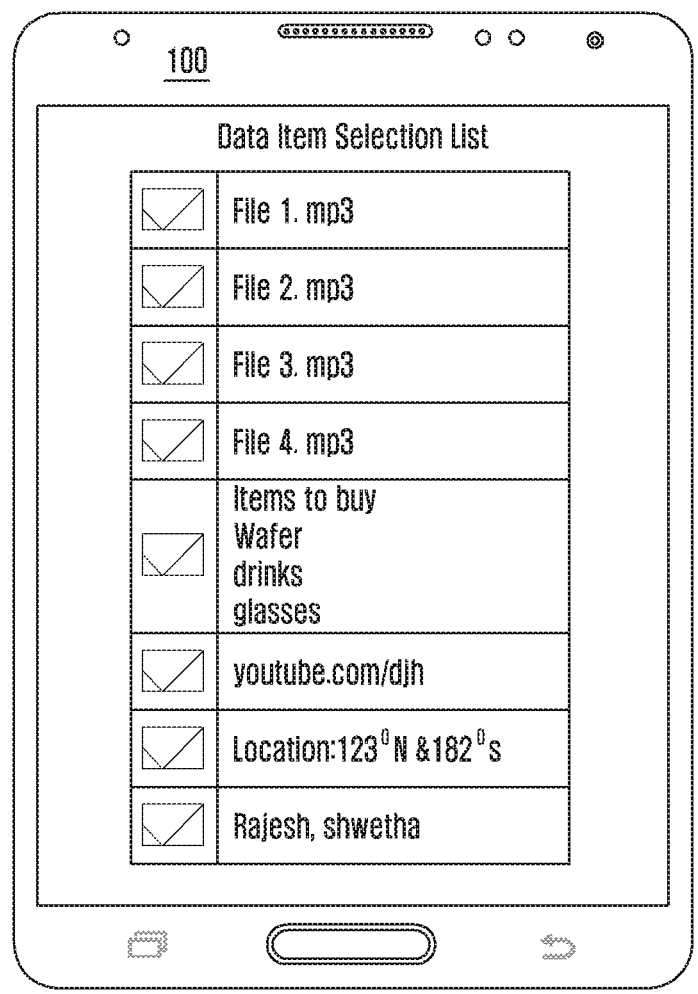
Figure 4C:
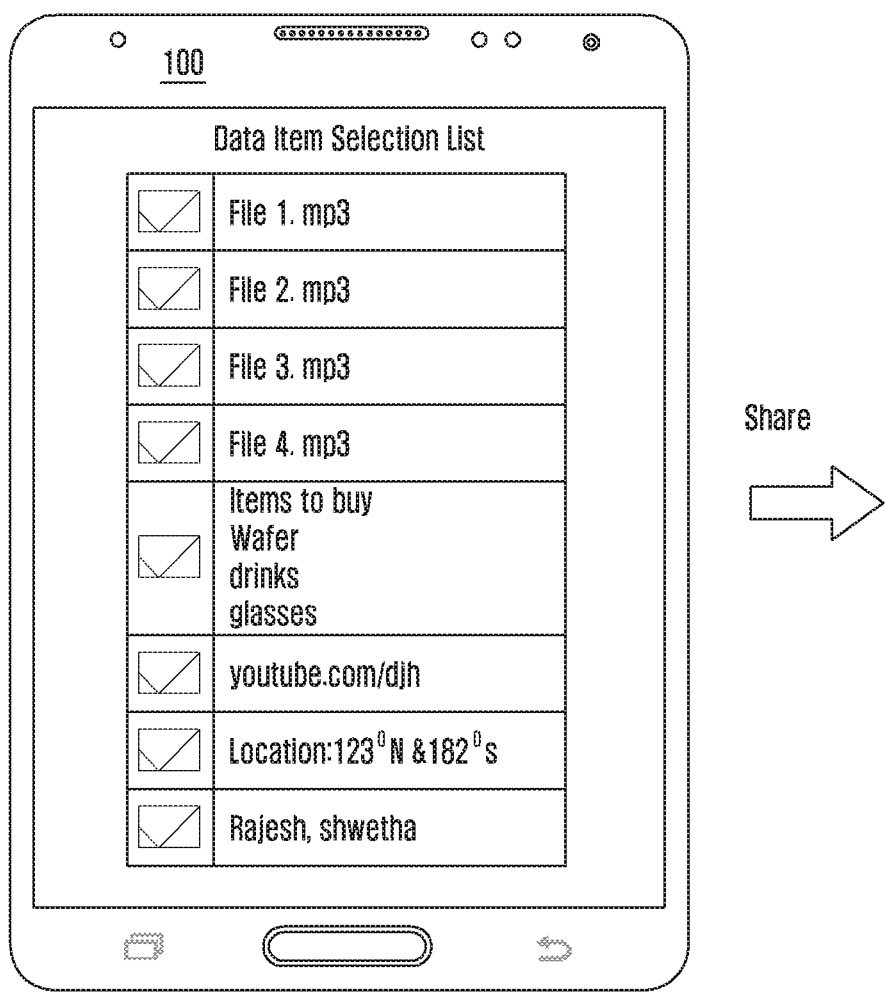

Referring to FIG. 4A, the electronic device 100 displays a plurality of applications such as a note application, a music application, a contact application, a maps application, and a YouTube™ application. For example, consider that the user of the electronic device 100 intends to plan a music night event and the user intends to share the details of the music night event with invitees of the music night event. In order to share the details of the music night event, the user performs the screen-grab event on the electronic device 100. When the screen-grab event is performed on the electronic device 100, the data items present in each application is grabbed. The data items in each application are grabbed to generate the data item selection list. In an embodiment, data item selection list may include at least one of text information, image information and other various type of information of the plurality of the data items. The data item selection list is displayed with checkboxes as shown in FIG. 4B. The data items (which are text) present in the note application, the music files displayed in the music player application, location coordinates in the map application, a URL of the YouTube™ application, and a contact group in the contact application are grabbed and displayed in the data item selection list as shown in FIG. 4B. Thus, when screen-grab event is performed on the electronic device 100, the data items are grabbed from each application and the data items are displayed in the data item selection list. The various operations involved in grabbing the data items from each application are explained in conjunction with FIGS. 5A to 5D. Further, the data item selection list can be shared with the invites of the music night event.

The music night event can be planned with the single screen-grab operation on the electronic device 100. When the screen-grab operation is performed, the text in the notes application, which includes items to buy (for the music night event) such as drinks, wafers, glasses, food are grabbed and displayed in the data item selection list. Further, the music files (which the user is interested to share with the invitees for the music night event) are grabbed from the music application). In a similar manner, the location coordinates for the music night event can be grabbed from the maps application. The contact group which includes invitees (Rajesh and shwetha) of the music night event is grabbed from the contact application. The URL of the YouTube™ video is grabbed from the YouTube™ application. Thus, when the screen-grab operation is performed on the electronic device 100, the data items displayed in each application are grabbed and displayed in the data item selection list as shown in FIG. 4B. In an embodiment, the electronic device 100 may determine an order of the data items in the data item selection list on the basis of property or content of the application. For example, if application 1 and application 2 are shopping applications or other type of application including a price of a product, the electronic device 100 shows application 1 close to application 2 in the item selection list. In this case, a user can compare the price of the product easily.

Figure 4D:
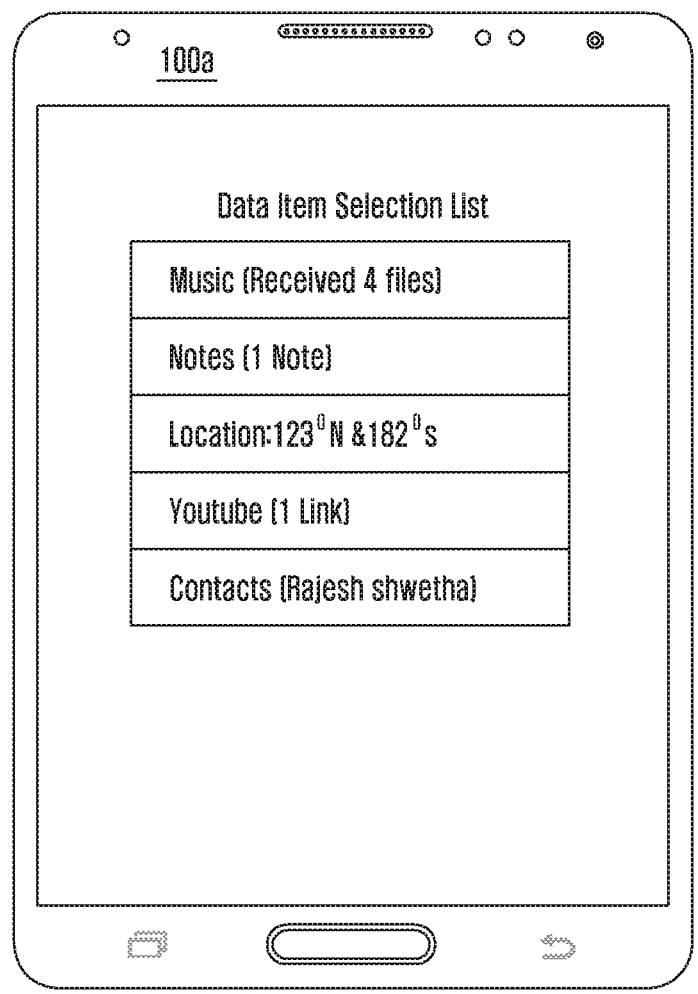

In an embodiment, the data items selection list can be shared with the electronic device 100a. The data item selection list can be shared with the electronic device 100a by performing an event on 'share' button (not shown in FIG. 4C). In an embodiment, the user can de-select the data items in the data item selection list before sharing the data item selection list. In an embodiment, the data item selection list can be shared with the electronic device 100a through any of the communication technologies such as Bluetooth, Wi-Fi and the like. Thus, the user can share the details of the music night event with the single screen-grab operation. When the data item selection list is shared with the electronic device 100a, the electronic device 100a displays the data item selection list as shown in FIG. 4D.

Figure 5A:
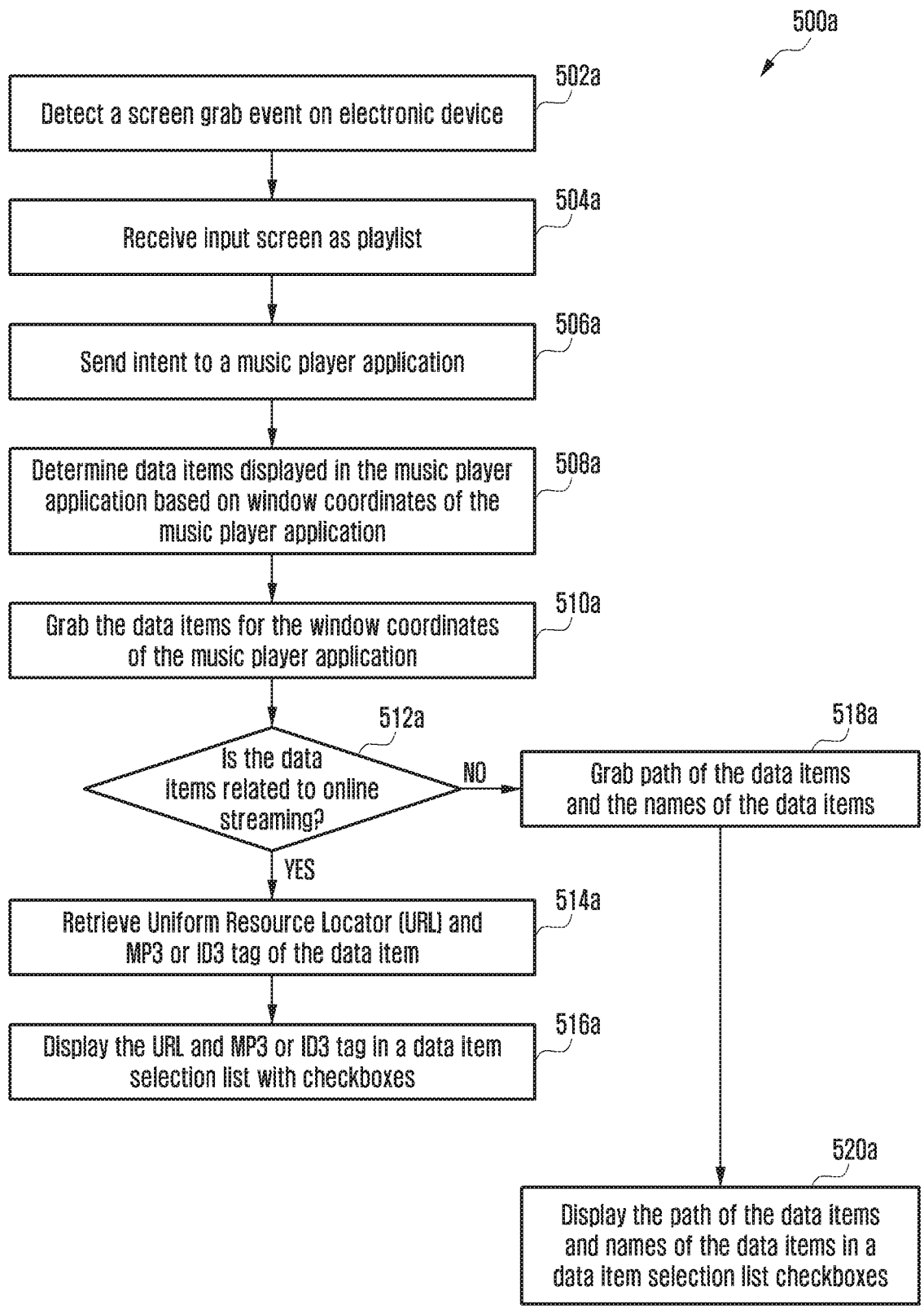
FIG. 5A is a flow chart illustrating a method for grabbing data items from a music player application according to an embodiment of the present disclosure.

FIG. 5A is a flow chart illustrating a method for grabbing data items from a music player application according to an embodiment of the present disclosure.

Referring to FIG. 5A, at operation 502a, the method 500a includes detecting the screen-grab event performed on the electronic device 100. The method 500a allows the screen-grab unit 204 to detect the screen-grab performed on the electronic device 100.

At operation 504a, the method 500a includes receiving an input screen as a playlist screen. The method 500a allows the controller unit 210 to receive the screen as the playlist screen. At operation 506a, the method 500 includes sending an intent to a music player application. The method 500a allows the controller unit 210 to send the intent to the music player application. At operation 508a, the method 500a includes determining data items displayed in the music player application based on coordinates of the music player application. The method 500a allows the controller unit 210 to determine the data items displayed in the music player application based on coordinates of the music player application. The coordinates of the music player application may mean coordinate information of window of the music player application in the screen. In an embodiment, the coordinate information of the music player application may be sent to the other electronic device with the data item selection list.

At operation 510a, the method 500a includes grabbing data items for the window coordinates of the music player application. The method 500a allows the controller unit 210 to grab the data items for the window coordinates of the music player application. At operation 512a, the method 500a includes determining whether the data item is related to online streaming. If it is determined that the data item is related to online streaming (YES) at operation 512a, then at operation 514a, the method 500a includes retrieving a URL, MP3 or ID3 tag of the data item. The method 500a allows the controller unit 210 to retrieve the URL, MP3 or ID3 tag of the data item.

At operation 516a, the method 500a includes displaying the URL and MP3 or ID3 tag of the data item in the data item selection list with checkboxes. The method 500a allows the controller unit 210 to display the URL and MP3 or ID3 to of the data item in the data item selection list with checkboxes. If it is determined that the data item is related to offline streaming (NO) at operation 512a, then at operation 518a, the method 500a includes grabbing a path of the data item and names of the data items. The method 500a allows the controller unit 210 to grab the path of the data items and the names of the data items. At operation 520a, the method 500a includes displaying the path of the data items and names of the data items in the data item selection list with checkboxes. The method 500a allows the controller unit 210 to display the path of the data items and the names of the data items in the data item selection list with checkboxes. The various actions, acts, blocks, operations, or the like in the method 500a may be performed in the order presented, in a different order or simultaneously. Further, in some embodiments, some of the actions, acts, blocks, operations, or the like may be omitted, added, modified, skipped, or the like without departing from the scope of the present disclosure.

Figure 5B:
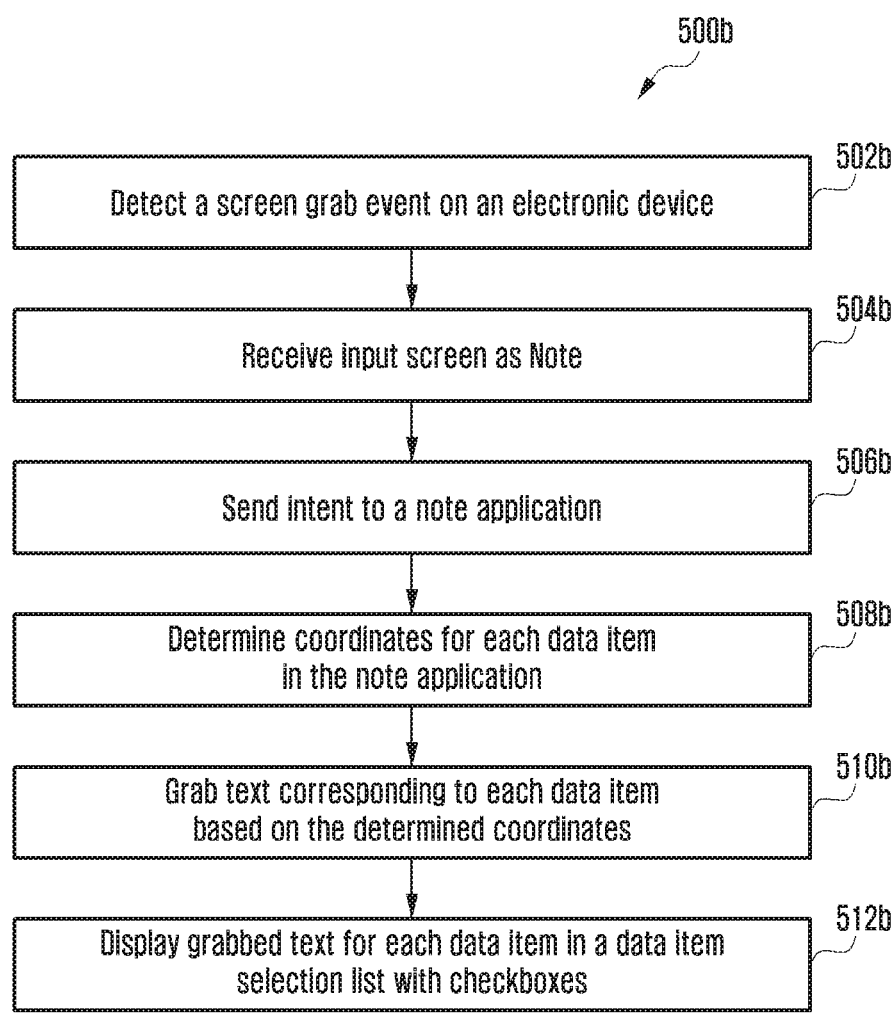
FIG. 5B is a flow chart illustrating a method for grabbing data items from a note application according to an embodiment of the present disclosure.

FIG. 5B is a flow chart illustrating a method for grabbing data items from a note application according to an embodiment of the present disclosure.

Referring to FIG. 5B, at operation 502b, the method 500b includes detecting the screen-grab event on the electronic device 100. The method 500b allows the screen-grab unit 204 to detect the screen-grab event on the electronic device 100. At operation 504b, the method 500b includes receiving an input screen as a note screen. The method 500b allows the controller unit 210 to receive the input screen as a note screen. At operation 506b, the method 500b includes sending an intent to a note application. The method 500b allows the controller unit 210 to send the intent to the note application. At operation 508b, the method 500b includes determining coordinates for each data item in the note application. The method 500b allows the controller unit 210 to determine the coordinated for each data item in the note application.

At operation 510b, the method 500b includes grabbing text corresponding to each data item based on the determined coordinates. The method 500b allows the controller unit 210 to grab text corresponding to each data item based on the determined coordinates. At operation 512b, the method 500b includes displaying grabbed text for each data item in a data item selection list with checkboxes. The method 500b allows the controller unit 210 to display the grabbed text for each data item in the data item selection list. The various actions, acts, blocks, operations, or the like in the method 500b may be performed in the order presented, in a different order or simultaneously. Further, in some embodiments, some of the actions, acts, blocks, operations, or the like may be omitted, added, modified, skipped, or the like without departing from the scope of the present disclosure.

Figure 5C:
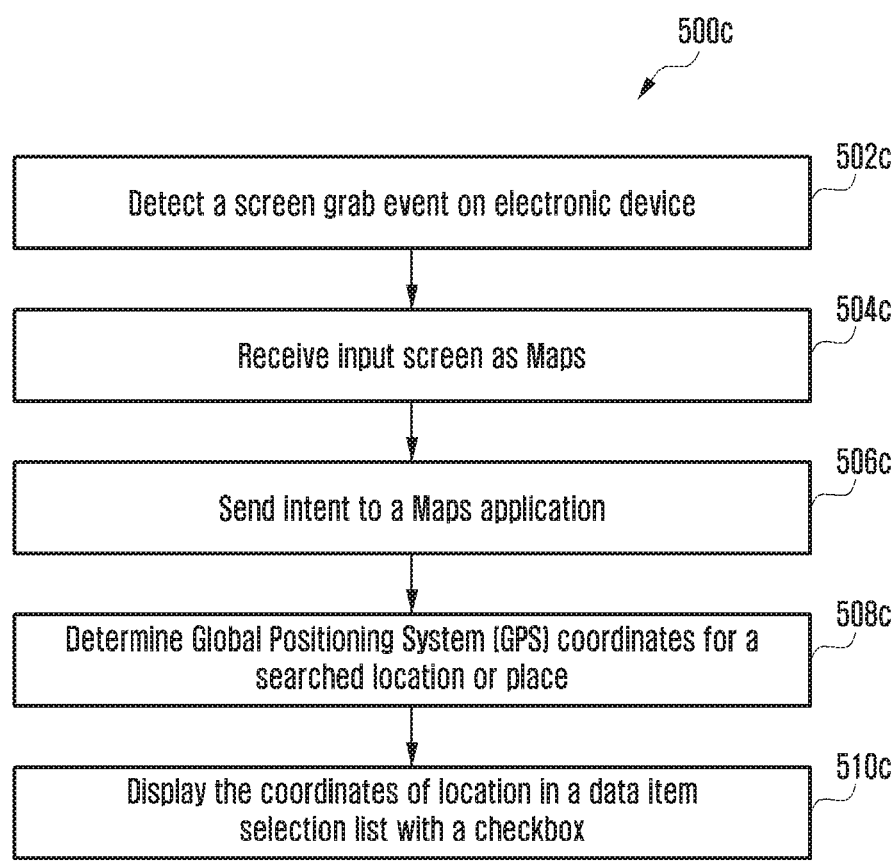
FIG. 5C is a flow chart illustrating a method for grabbing location coordinates from a map application according to an embodiment of the present disclosure.

FIG. 5C is a flow chart illustrating a method for grabbing location coordinates from a map application according to an embodiment of the present disclosure.

Referring to FIG. 5C, at operation 502c, the method 500c includes detecting a screen-arab on the electronic device 100. The method 500c allows the screen-grab unit 204 to detect the screen-grab on the electronic device 100. At operation 504c, the method 500c includes receiving an input screen as a maps screen. The method 500b allows the controller unit 210 to receive the input screen as the maps screen. At operation 506c, the method 500c includes sending an intent to a maps application. The method 500c allows the controller unit 210 to send the intent to the maps application. At operation 508c, the method 500c includes determining global positioning system (GPS) coordinates for a searched location or place. The method 500c allows the controller unit 210 to determine the GPS coordinates of the searched location or place.

At operation 510c, the method 500c includes displaying coordinates of a location in a data item selection list with a checkbox. The method 500c allows the controller unit 210 to display the coordinates of the location in the data item selection list. The various actions, acts, blocks, operations, or the like in the method 500c may be performed in the order presented, in a different order or simultaneously. Further, in some embodiments, some of the actions, acts, blocks, operations, or the like may be omitted, added, modified, skipped, or the like without departing from the scope of the present disclosure.

Figure 5D:
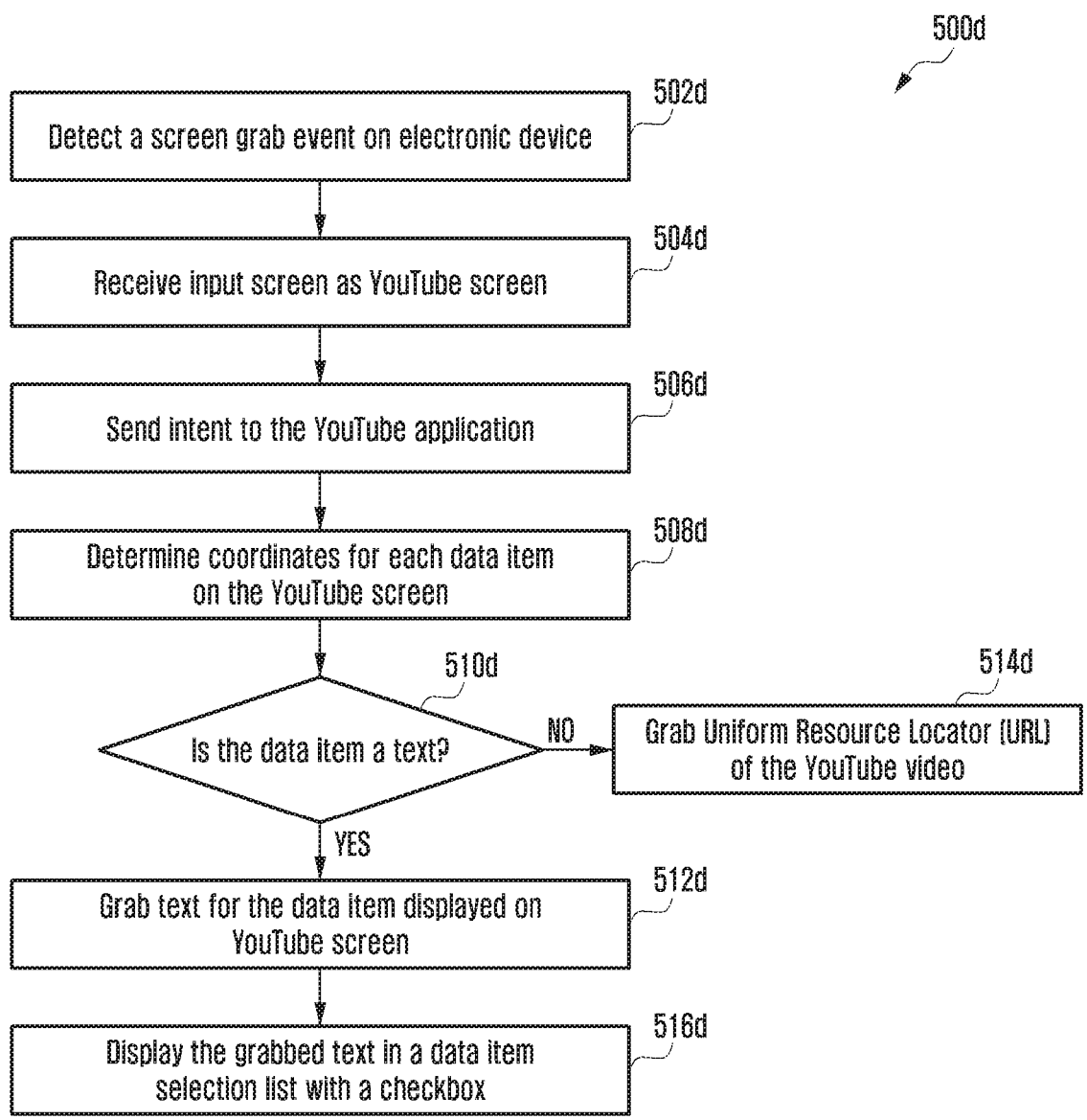
FIG. 5D is a flow chart illustrating a method for grabbing data items in a video application according to an embodiment of the present disclosure.

FIG. 5D is a flow chart illustrating a method for grabbing data items in a video application according to an embodiment of the present disclosure.

Referring to FIG. 5D, at operation 502d, the method 500d includes detecting a screen-grab on the electronic device 100. The method 500d allows the screen-grab unit 204 to detect the screen-grab on the electronic device 100. At operation 504d, the method 500d includes receiving an input screen as a YouTube™ screen. The method 500b allows the controller unit 210 to receive the input screen as the YouTube™ screen. At operation 506d, the method 500d includes sending an intent to a YouTube™ application. The method 500d allows the controller unit 210 to send the intent to the YouTube™ application.

At operation 508d, the method 500d includes determining coordinates for each data item on the YouTube™ screen. The method 500d allows the controller unit 210 to determine coordinates for each data item on the YouTube™ screen. At operation 510d, the method 500d includes determining whether the data item is text. The method 500d allows the controller unit 210 to determine whether the data item is a text. If it is determined that the data item is text (YES) at operation 510d then, at operation 512d, the method 500d includes grabbing text for the data item displayed on the YouTube™ screen. The method 500d allows the controller unit 210 to grab the text for the data item displayed on the YouTube™ screen.

At operation 516d, the method 500d includes displaying the grabbed text in the data item selection list with a checkbox. The method 500d allows the controller unit to display the grabbed text in the data item selection list with a checkbox. If it is determined that the data item is a URL (NO) at operation 510d then, at operation 514d, the method 500d includes grabbing the URL of a YouTube™ Video. The method 500d allows the controller unit 210 to grab the URL of the YouTube™ video. The various actions, acts, blocks, operations, or the like in the method 500d may be performed in the order presented, in a different order or simultaneously. Further, in some embodiments, some of the actions, acts, blocks, operations, or the like may be omitted, added, modified, skipped, or the like without departing from the scope of the present disclosure.

Figure 5E:
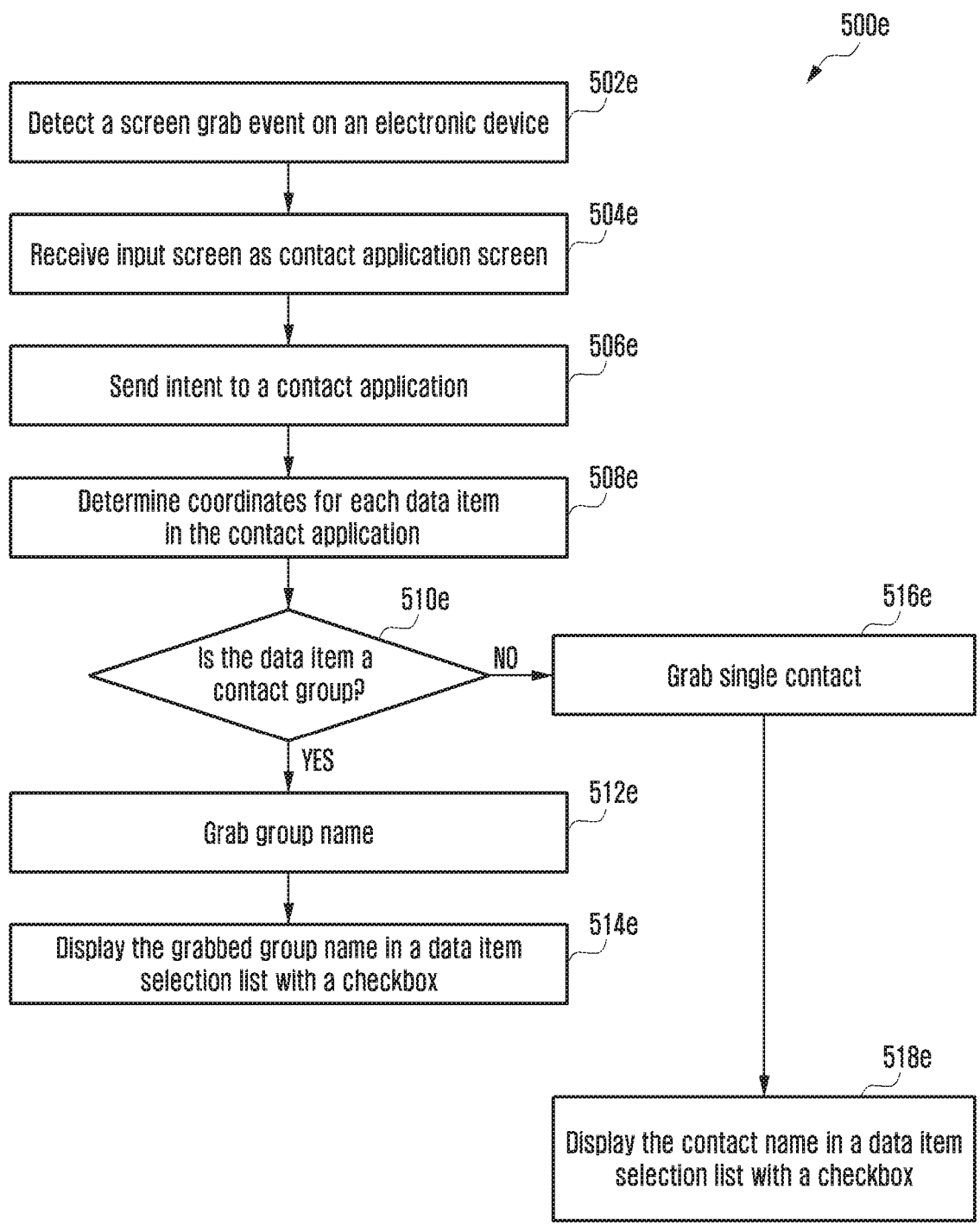
FIG. 5E is a flow chart illustrating a method for grabbing data items in a contact application according to an embodiment of the present disclosure.

FIG. 5E is a flow chart illustrating a method for grabbing data items in contact application according to an embodiment of the present disclosure.

Referring to FIG. 5E, at operation 502e, the method 500e includes detecting a screen-grab on the electronic device 100. The method 500e allows the screen-grab unit 204 to detect the screen-grab on the electronic device 100. At operation 504e, the method 500d includes receiving an input screen as a contact application screen. The method 500b allows the controller unit 210 to receive the input screen as the contact application screen. At operation 506e, the method 500e includes sending an intent to a contact application. The method 500e allows the controller unit 210 to send the intent to the contact application.

At operation 508e, the method 500d includes determining coordinates for each data item in the contact application. The method 500d allows the controller unit 210 to determine coordinates for each data item in the contact application. At operation 510e, the method 500e includes determining whether the data item is a contact group. The method 500e allows the controller unit 210 to determine whether the data item is a contact group.

If it is determined that the data item is a contact group (YES) at operation 510e then, at operation 512e, the method 500e includes grabbing the group name. The method 500e allows the controller unit 210 to grab the group name. At operation 514e, the method 500e includes displaying the grabbed group name in a data item selection list with a checkbox. The method 500e allows the controller unit 210 to display the grabbed group name in the data item selection list with the checkbox.

It is determined that the data item is a single contact (NO) at operation 510e then, at operation 516e, the method 500e includes grabbing the single contact. The method 500e allows the controller unit 210 to grab the singe contact. At operation 518e, the method 500e includes displaying a contact name in a data item selection list with a checkbox. The method 500e allows the controller unit 210 to display the contact name in the data item selection list. The various actions, acts, blocks, operations, or the like in the method 500e may be performed in the order presented, in a different order or simultaneously. Further, in some embodiments, some of the actions, acts, blocks, operations, or the like may be omitted, added, modified, skipped, or the like without departing from the scope of the present disclosure.

Figure 6A:
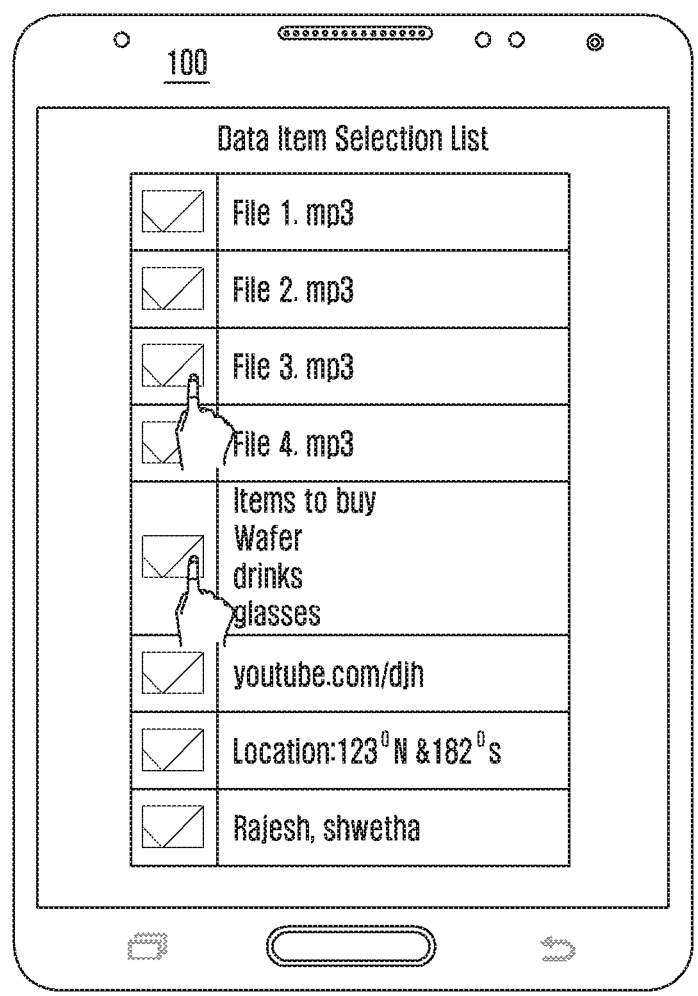
FIGS. 6A and 6B illustrate an action of selecting and de-selecting data items in a data item selection list displayed on an electronic device according to various embodiments of the present disclosure.
Figure 6B:
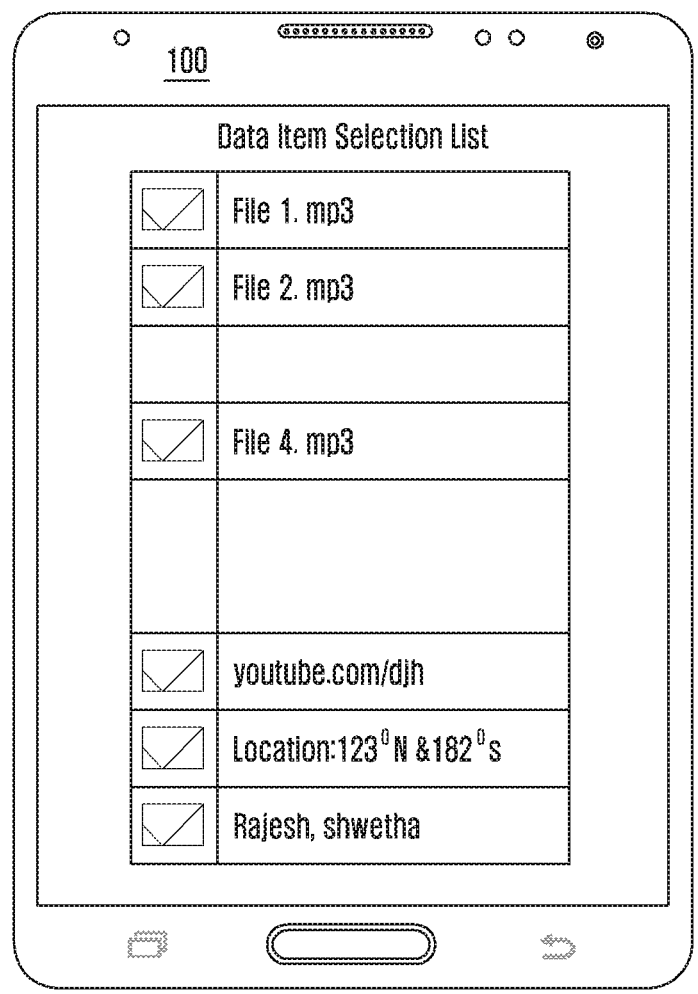

FIGS. 6A and 6B illustrate selecting and de-selecting data items in an electronic device according to various embodiments of the present disclosure.

Referring to FIGS. 6A and 6B, it should be noted that the data item selection list displayed on the electronic device 100 includes one or more data items which are grabbed from each application displayed on the electronic device 100. Further, the data items in the data item selection list can be selected or de-selected by the user. In an embodiment, the electronic device may receive an input signal for selecting at least one data item in the displayed list and removing the selected at least one data item from the displayed list. As depicted in FIG. 6A, the data items can be selected in the data item selection list. The user can select the one or more data items in the data item selection list. Further, the user can de-select the one or more data items from the data item selection list. When the one or more data items are de-selected from the data item selection list, the remaining data items (other than the de-selected data items) in the data item selection list are displayed on the screen of the electronic device 100 as shown in FIG. 6B.

Figure 7A:
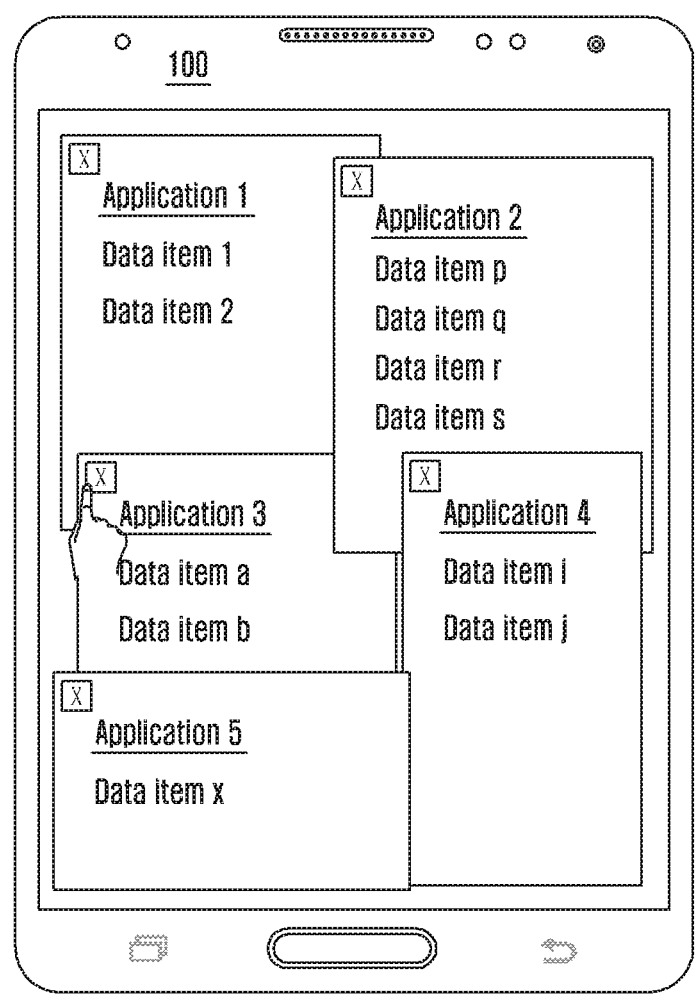
FIGS. 7A to 7C illustrate an action of closing applications displayed on an electronic device for generating a data item selection list according to various embodiments of the present disclosure.
Figure 7B:
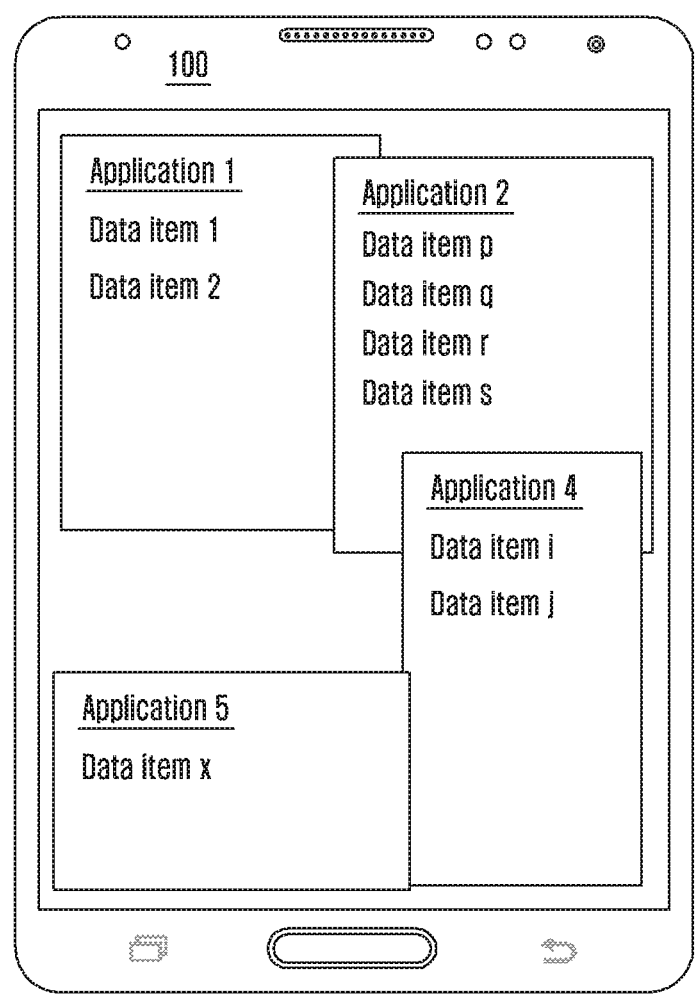
Figure 7C:
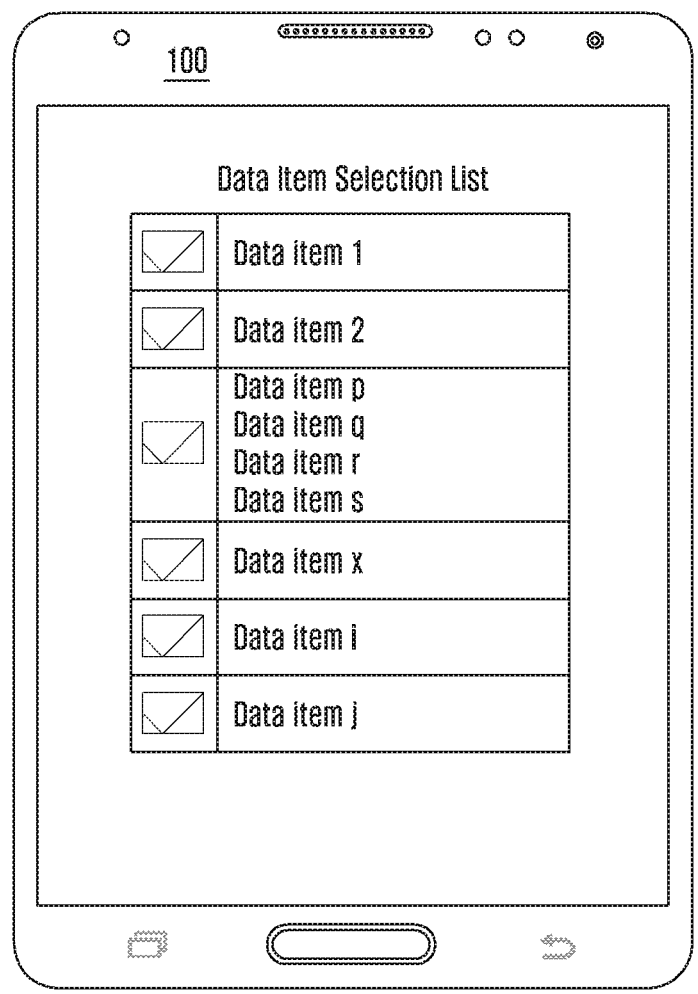

FIGS. 7A to 7C illustrate closing of applications displayed in an electronic device for selecting data items according to various embodiments of the present disclosure.

Referring to FIGS. 7A to 7C, the electronic device may receive an input signal for selection of at least one application of the plurality of applications displayed on the screen, and the controller unit may identify at least one data item of the selected at least one application. As depicted in FIG. 7A, the applications displayed on the screen of the electronic device 100 can be closed. When an application displayed on the electronic device 100 is closed, the remaining applications (which are not closed) are displayed on the electronic device 100 as shown in FIG. 7B. Further, the screen-grab event can be performed on the electronic device 100 to grab the data items from the remaining applications. When the screen-grab event is performed, the data items in each of the remaining applications are grabbed. The data item selection list is generated with the data items in each of the remaining applications and the data item selection is displayed as shown in FIG. 7C.

In an embodiment, an application displayed on the screen of the electronic device 100 (in FIG. 7A) can be selected and the selected application can be dragged to a bin, in order to close the application displayed on the screen of the electronic device 100.

Figure 8A:
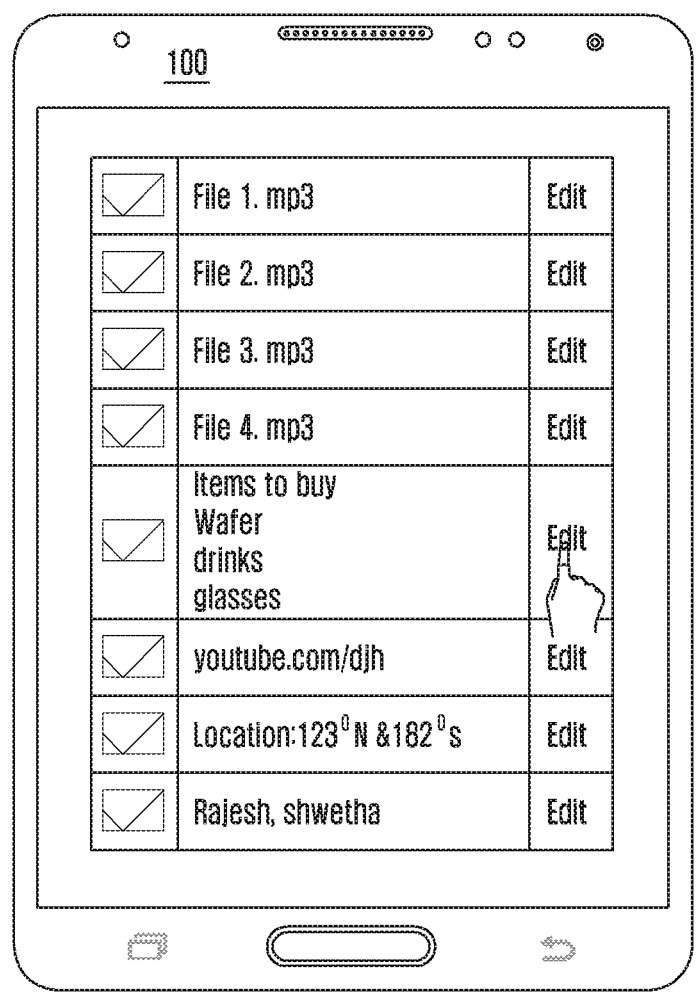
FIGS. 8A and 8B illustrate an action of editing data items in a data item selection list displayed on an electronic device according to various embodiments of the present disclosure.
Figure 8B:
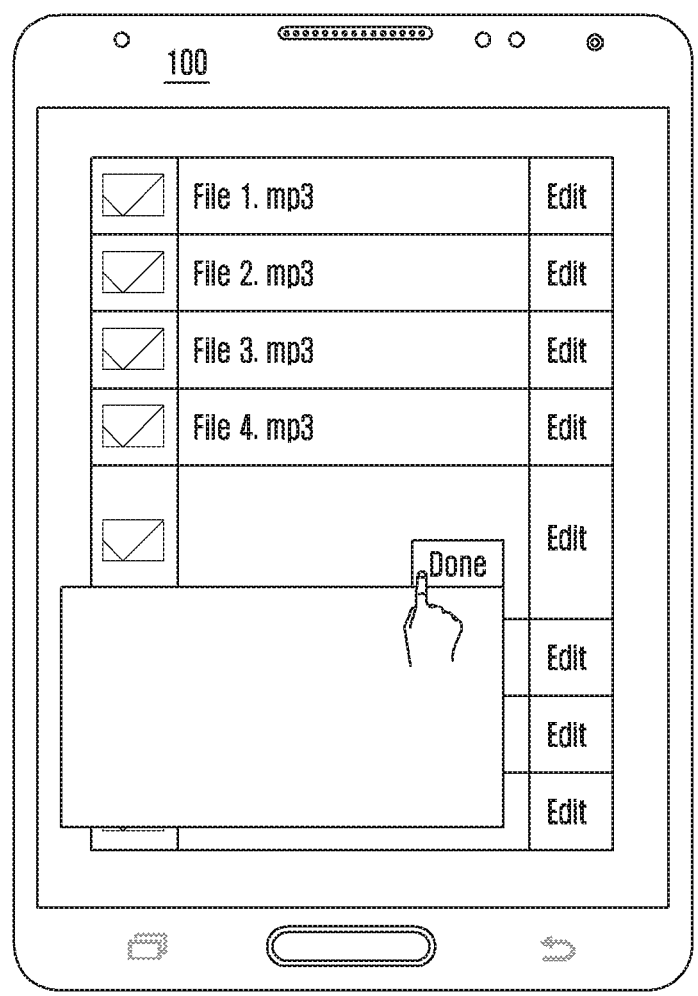

FIGS. 8A and 8B illustrate an action of editing data items in a data item selection list displayed in an electronic device according to various embodiment of the present disclosure.

Referring to FIGS. 8A and 8B, the data item selection list displayed in the electronic device 100 can be edited for updating or modifying the content in each data item. For example, if the data item includes location details obtained from a maps application, the location details can be edited by adding additional information to the location details. As depicted in FIG. 8A, the data item to be edited in the data item selection list is selected. When the data item is selected for editing, the selected data item is displayed in a window as shown in FIG. 8B. The data item can be edited (as desired) and then the window can be closed by tapping on the "done" button.

Figure 9A:
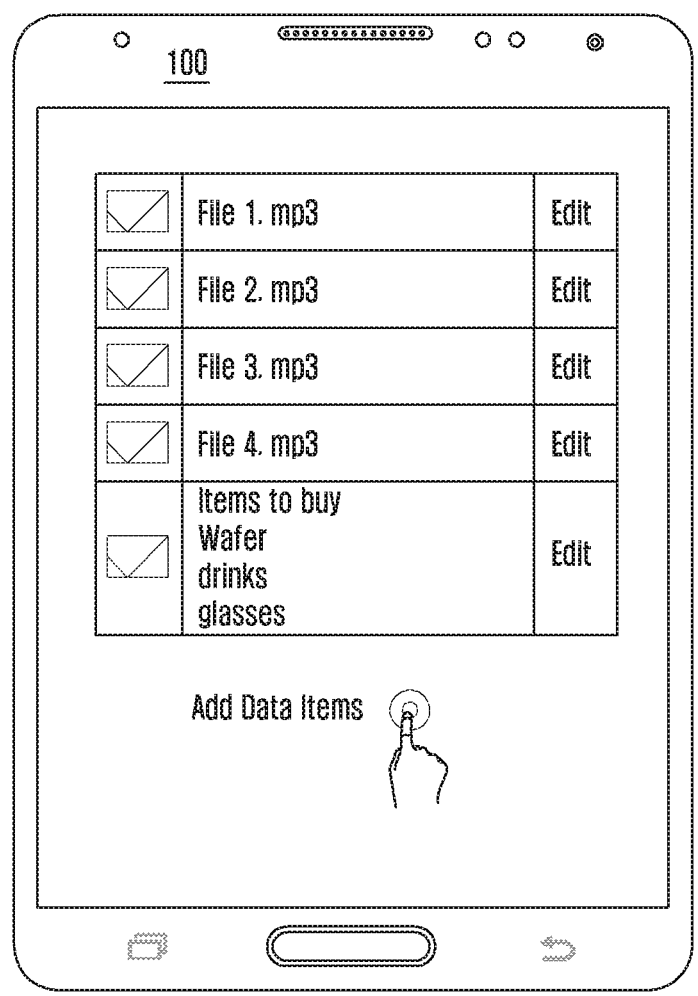
FIGS. 9A to 9C illustrate an action of adding data items to a data item selection list displayed on an electronic device according to various embodiments of the present disclosure.
Figure 9B:
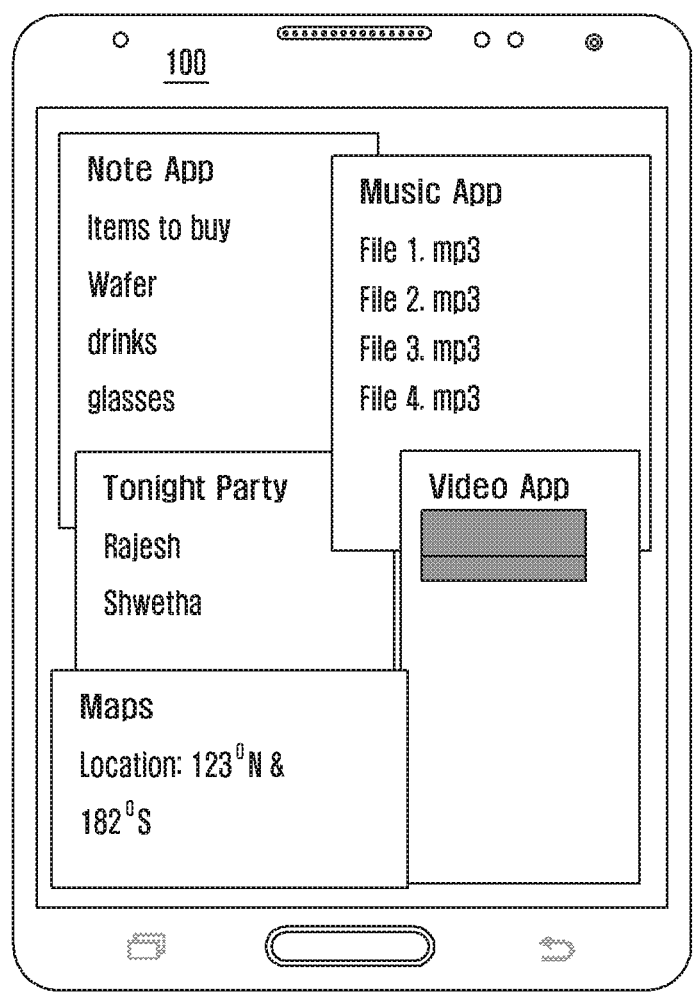
Figure 9C:
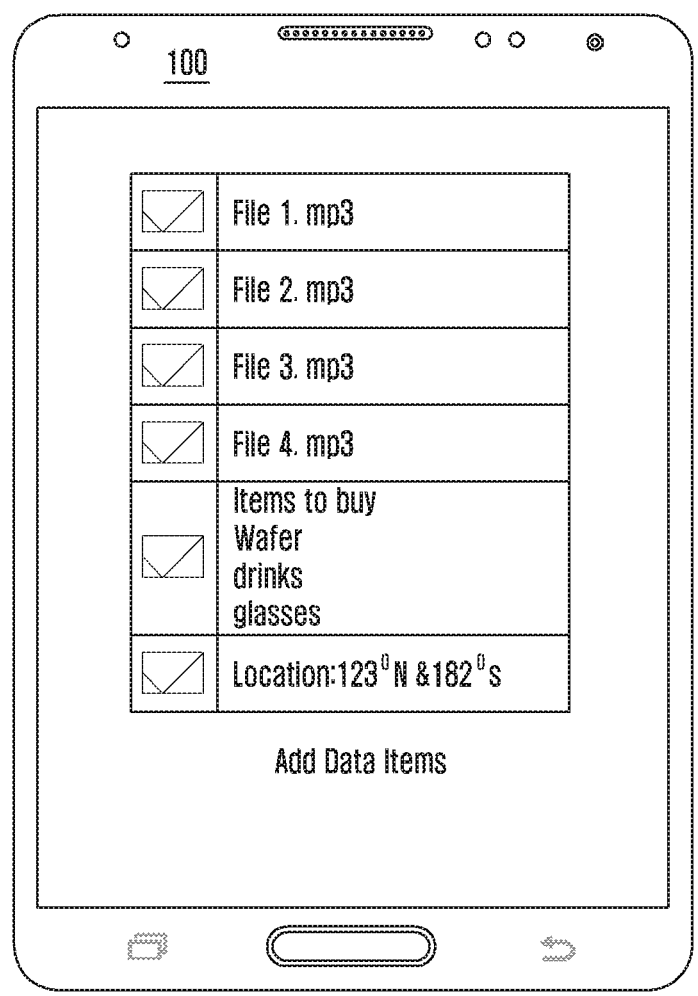

FIGS. 9A to 9C illustrate adding data items to a data item selection list displayed in an electronic device according to various embodiments of the present disclosure. In an embodiment, the data items can be added to the data item selection list.

Referring to FIG. 9A, the data items can be added to the data item selection list, by tapping on the "add data items" button. When the "add data items" button is tapped, the plurality of applications are displayed on the electronic device 100 as shown in FIG. 9B. The screen-grab operation can be performed on the electronic device 100 in order to add the data items to the data item selection list. When the screen-grab operation is performed on the electronic device 100, the data items are added to the data item selection list and the data item selection list is displayed on the electronic device 100 as shown in FIG. 9C.

Figure 10A:
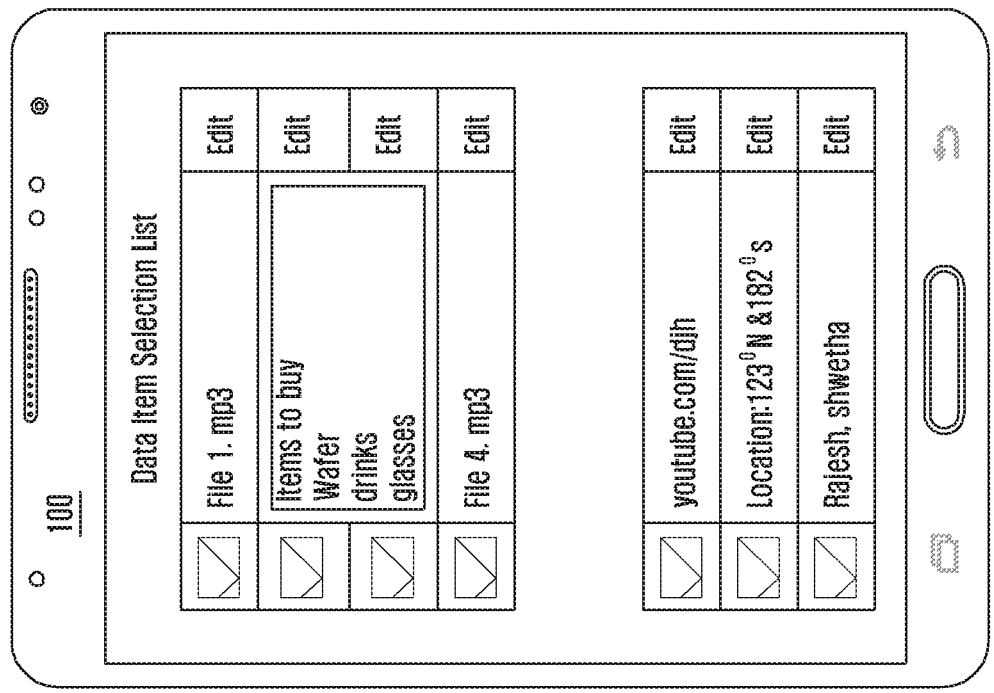
FIG. 10A illustrates an action of prioritizing data items in a data item selection list displayed on an electronic device according to an embodiment of the present disclosure.
Figure 10A:
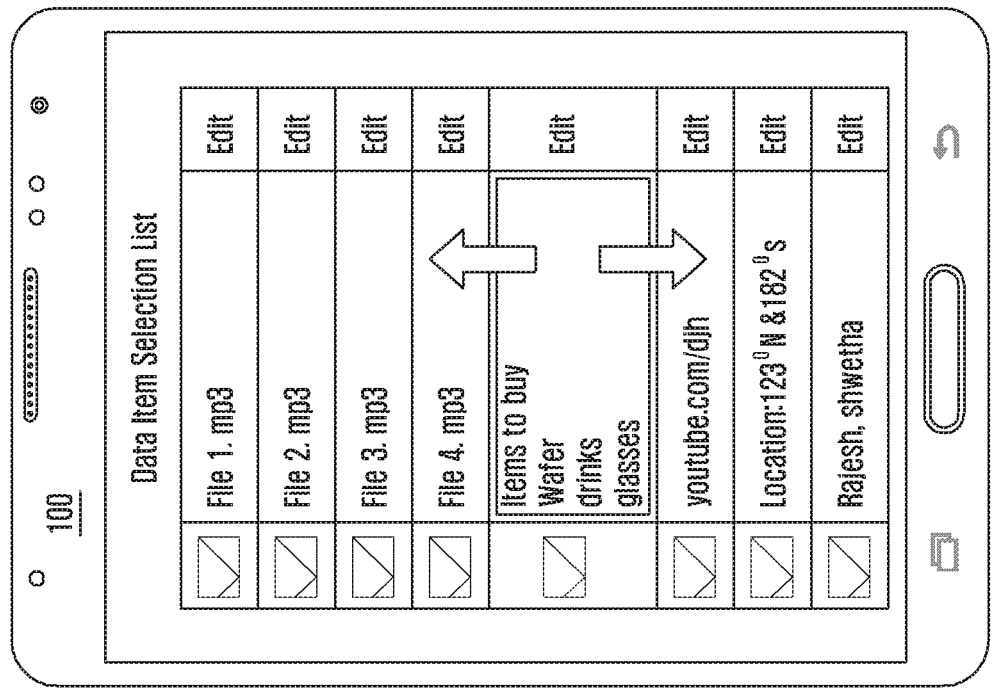

FIG. 10A illustrates prioritizing data items in a data item selection list according to an embodiment of the present disclosure. In an embodiment, the data items in the data item selection list can be prioritized.

Referring to FIG. 10A, the data items in the data item selection list can be prioritized by dragging the selected data items upside or downside on the screen of the electronic device 100. For example, if the selected data item is dragged upside, the selected data item is prioritized in the data item selection list. The priority is assigned to the data items based on a position or order of the data items (which is affected by dragging the data items).

FIG. 10B illustrates an action of removing data items in a data item selection list displayed on an electronic device according to an embodiment of the present disclosure.

Referring to FIG. 10B, it should be understood that the priority of the data items is assigned as per the position or the order of the data items in the data item selection list. Further, it should be noted that, the data item which is dragged upside in the data item selection list is displayed as a first data item to a recipient, when the data item selection list is shared with the recipient.

Although the figures are not shown for certain actions performed on the data item selection list displayed on the screen of the electronic device 100, it should be understood that the actions of copying the one or more data items in the data item selection list from one location to another location in the electronic device 100, shifting the one or more data items in the data item selection list from one location to another location in the electronic device 100, opening the one or more data items in the data item selection list using an application in the electronic device 100 can be performed without deviating from the scope of the present disclosure.

FIG. 10B illustrates removing the data items in the data item selection list, according to an embodiment as disclosed herein. In an embodiment, the data items in the data item selection list can be removed. As depicted in FIG. 10B, initially, a data item to be removed can be selected in the data item selection list. Further, the selected data item can be removed by dragging or swiping the selected data item to a right side of the screen of the electronic device 100. When the selected data item is dragged to the right side of the screen of the electronic device 100, the selected data item is removed from the data item selection list as shown in FIG. 10B.

In an embodiment, the data items in the data item selection list can be previewed by clicking on a "preview" button (provided for each data item). When the "preview" button is clicked on a data item, the data item displays a pop up containing a snapshot of an application window from which the data item is grabbed. The pop up can be closed by tapping (anywhere on) the screen of the electronic device 100. Thus, the data items in the data item selection list can be previewed and a source application (from which the data item is grabbed) can be viewed in the data item selection list.

Figure 11A:
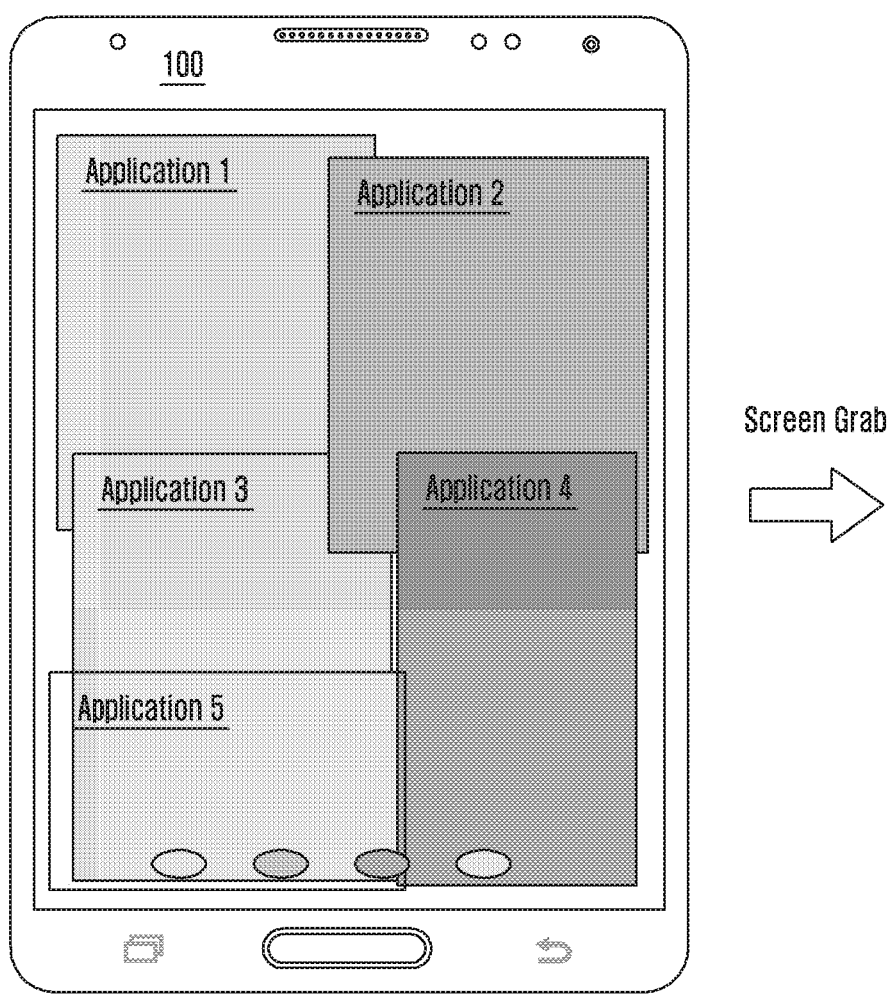
FIGS. 11A and 11B illustrate an action of grouping data items in a data item selection list displayed on an electronic device according to various embodiments of the present disclosure.
Figure 11B:
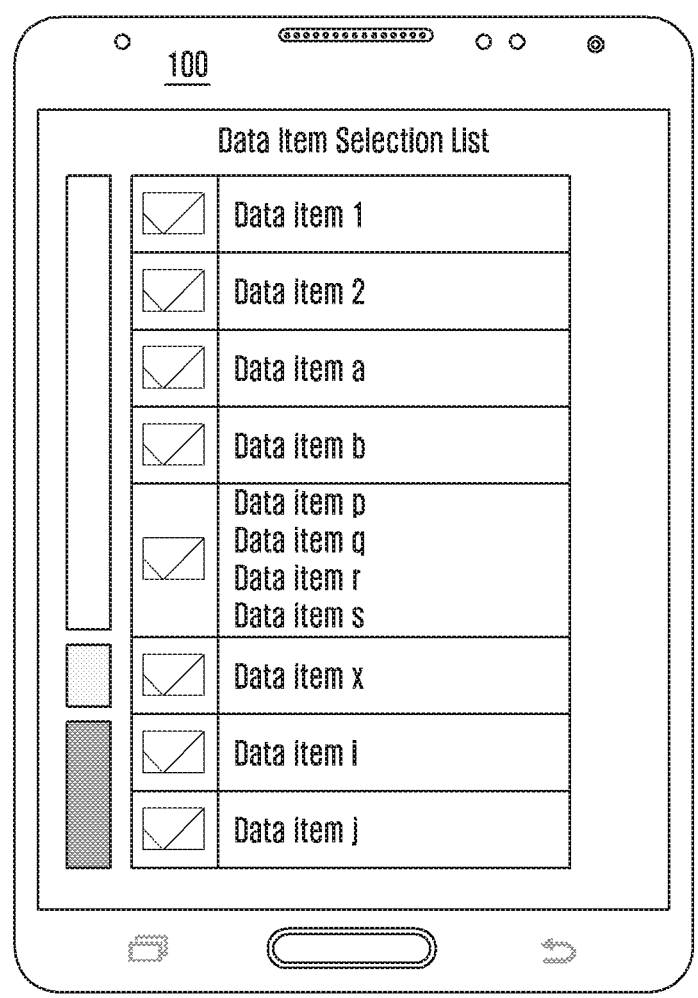

FIGS. 11A to 11B illustrate an action of grouping data items in a data item selection list according to various embodiments of the present disclosure.

Referring to FIGS. 11A and 11B, the data items can be grouped based on the applications from which the data items are grabbed. In an embodiment, the applications can be grouped based on the user selection and/or a property of the applications. In an embodiment, at least one application grouped with same group may be displayed with a same graphical effect (for example, same or similar color).

Referring to FIG. 11A, a similar color can be assigned to the applications displayed on the screen of the electronic device 100 by tapping the application. In order to assign a color to the applications displayed on the screen of the electronic device 100, a user may perform an action of tapping the application. For example, a red color can be assigned to some applications and a green color to other applications by tapping on those applications. When the screen-grab operation is performed on the electronic device 100, the data item selection list is generated with the data items grabbed from the applications. The data item selection list displays the data items with a similar color (as assigned to those applications from which the data items are grabbed).

Referring to FIG. 11B, the data items in the data item selection list are grouped based on the color (assigned to the applications from which the data items are grabbed). In an embodiment, the user may select at least one group of applications among the plurality of groups, and the data item selection list may include at least one data item of at least one application of a selected group. In this case, data items in an unselected group may be removed from the data item selection list.

Figure 12A:
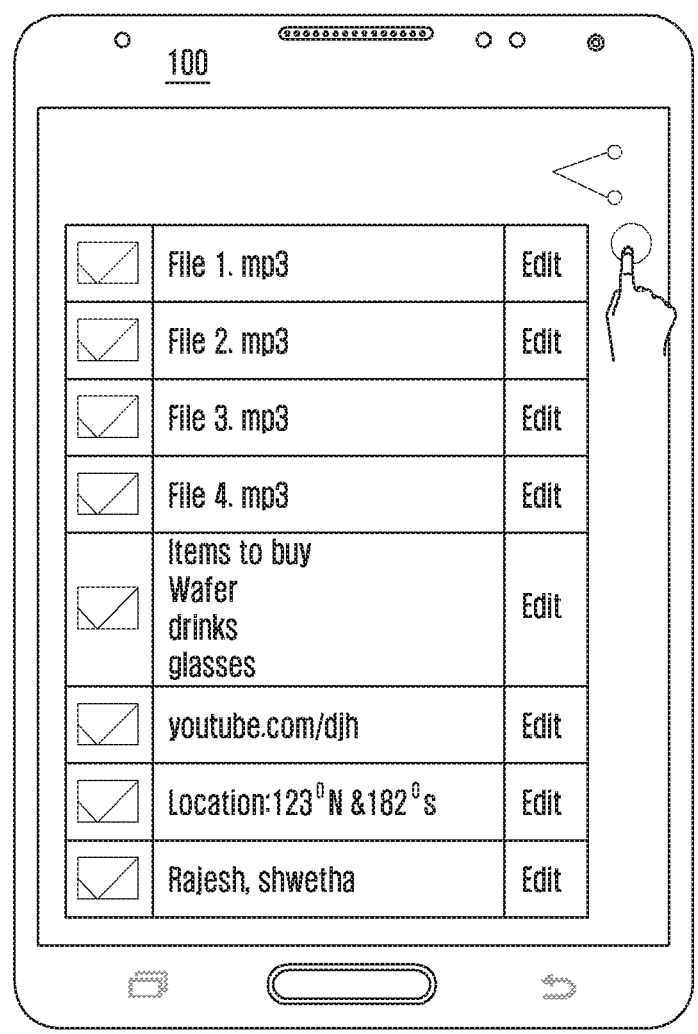
FIGS. 12A to 12C illustrate an action of sharing data items in a data item selection list displayed on an electronic device with multiple recipients according to various embodiments of the present disclosure.
Figure 12B:
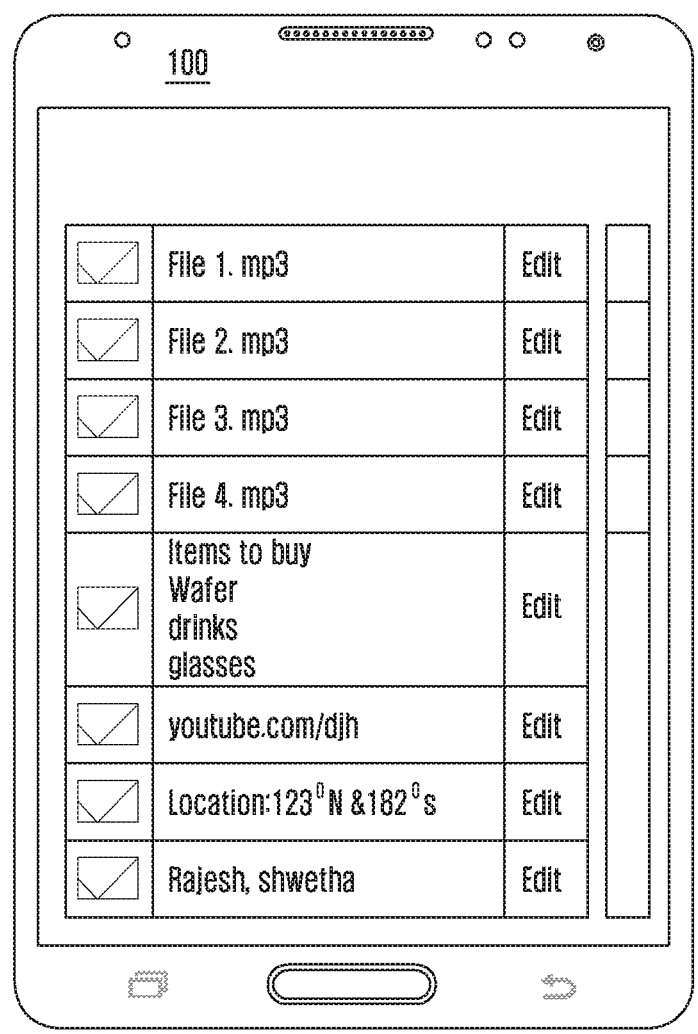
Figure 12C:
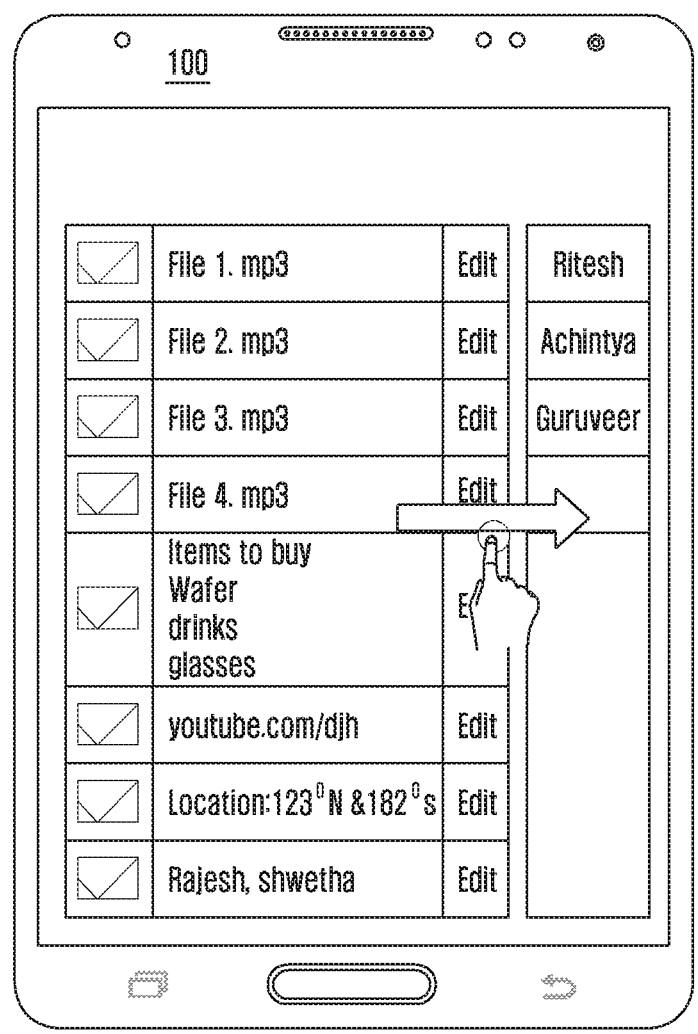

FIGS. 12A to 12C illustrate an action of sharing data items with multiple users according to various embodiments of the present disclosure. In an embodiment, the data items in the data item selection list can be shared with multiple users.

Referring to FIG. 12A, the share button can be clicked to view the list of users (recipients) to which the data item selection list can be shared. A long press on a selected data item reduces a width of the data item selection list and a width of a list of user's increases, as shown in FIGS. 12B and 12C. Further, the selected data item can be dragged on to the user name (recipient name) for sharing the selected data item, as shown in FIG. 12C. If the data items are grouped based on color (as described in FIG. 11A and FIG. 11B), the grouped data items are shared with a user at a single instance.

Figure 13A:
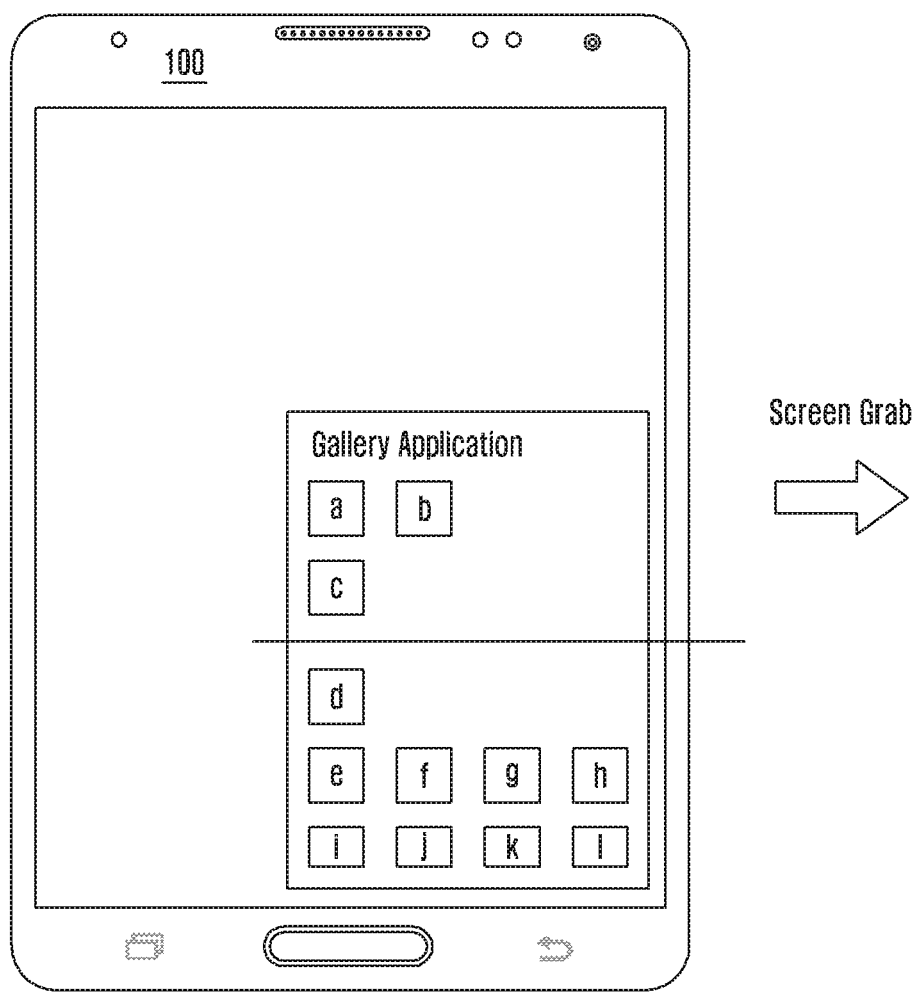
FIGS. 13A and 13B show an example scenario in which an electronic device displays a data item selection list having data items grabbed from a gallery application according to various embodiments of the present disclosure.
Figure 13B:
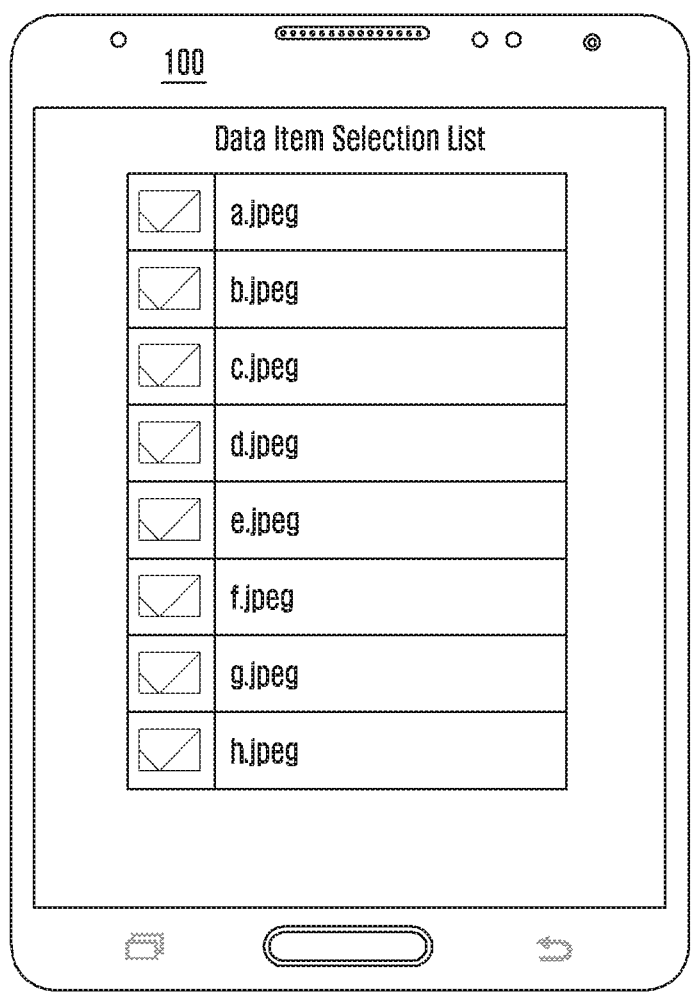

FIGS. 13A and 13B show an example scenario in which an electronic device displays a data item selection list having data items grabbed from a gallery application according to various embodiments of the present disclosure. In an embodiment, the data items from each application displayed on the screen of the electronic device 100 is grabbed based on a predefined criteria.

Referring to FIG. 13A, in the gallery application, the one or more images can be grabbed based on the images which are closer to a vertical center of a gallery application window. It should be noted that the horizontal center is not considered, as the images are displayed as per sorting mechanism aligned to the left. In case of rotation, the gallery application window also rotates, thus changing the vertical center accordingly.

In an embodiment, the images which are displayed closer to vertical center of the gallery window are selected, as shown in FIG. 13B. The user can configure the distance from vertical center to be used for selecting the images in the gallery window. The proposed method can be used along with zoom to control number of images displayed for selection of images.

A following example is described herein for grabbing the images in a gallery application. Consider that a user is previewing the gallery application. The methods according to the related art enable the user to long-press on an image to select the image. In order to select all images, the user has to perform another action. In an embodiment, if the user is viewing a set of images, it can be inferred that the user wants to share those images. With the proposed method, the screen-grab event can be performed on the electronic device 100 to select the images which are displayed to the user on the screen of the electronic device. Hence, with a single screen-grab event, the user can select the images without undergoing extensive number of operations.

In another example, from the gallery application, the data item selection list can be generated with recently used or modified images in the gallery application. When the screen grab operation is performed, the data item selection list is generated with recently used or modified images in the gallery application and only those recently used or modified images are displayed to the user in the data item selection list.

Figure 14A:
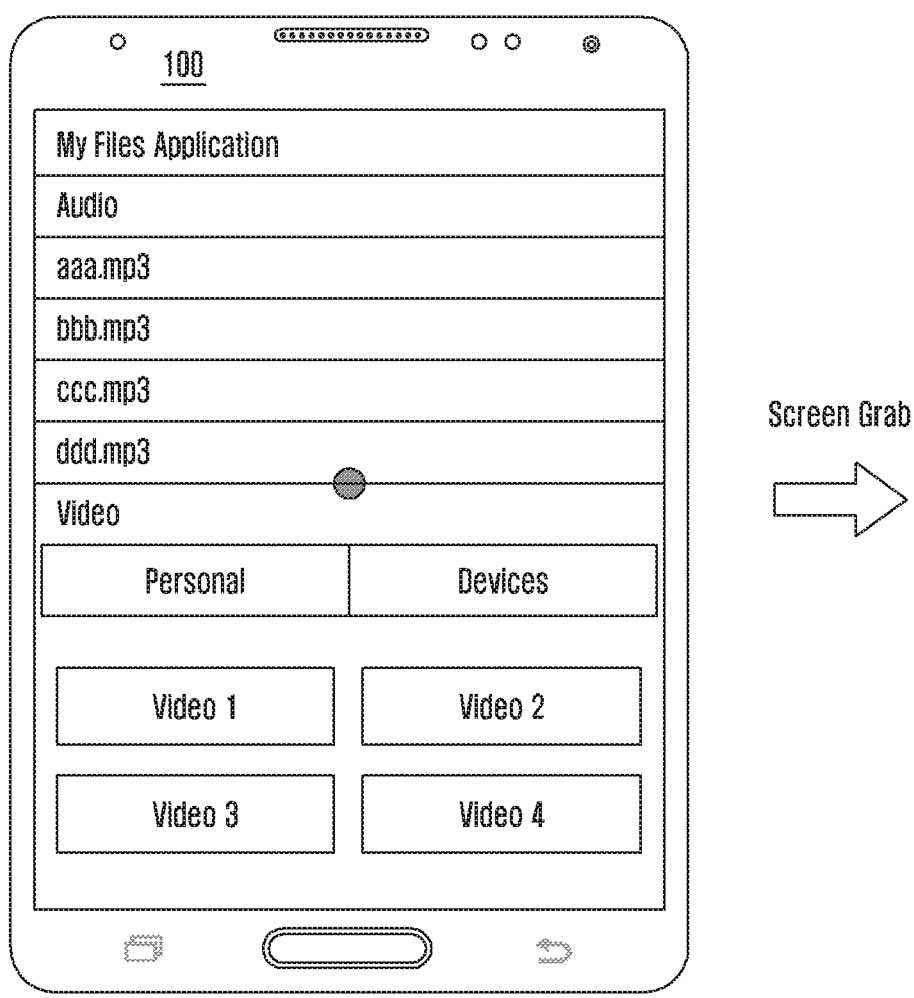
FIGS. 14A and 14B show an example scenario in which an electronic device displays a data item selection list having data items grabbed from "My Files" application displayed on the electronic device when a screen grab function is activated according to various embodiments of the present disclosure.
Figure 14B:
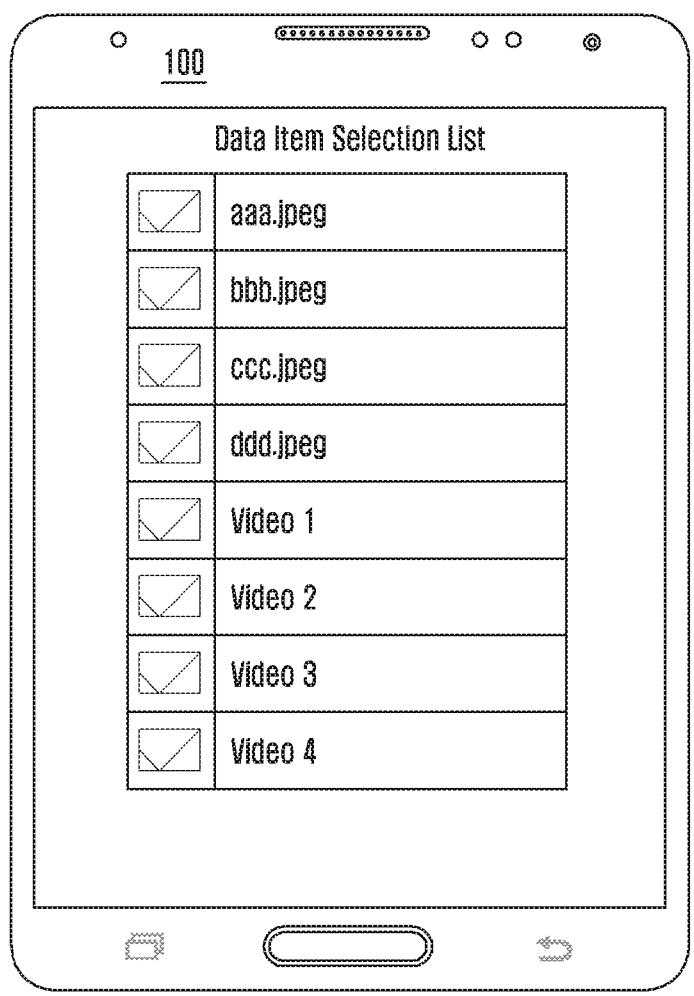

FIGS. 14A and 14B show an example scenario in which an electronic device displays a data item selection list having data items grabbed from "My Files" application displayed on the electronic device 100 when a screen grab function is activated according to various embodiments of the present disclosure.

Referring to FIG. 14A, the "My Files" application displays music (audio) files and video files on the screen of the electronic device 100, if the user intends to share the music files and video files, the screen grab event can be performed on the electronic device 100. When the screen-grab event is performed on the electronic device 100, the music files and the video files displayed on the screen of the electronic device 100 are grabbed. The music files and video files are displayed in the data item selection list with checkboxes as shown in FIG. 14B. One or more actions such as selecting or de-selecting the music files and video files can be performed on the data item selection list. The data item selection list can be copied or shared through messenger and social media using available communication technologies.

Figure 15A:
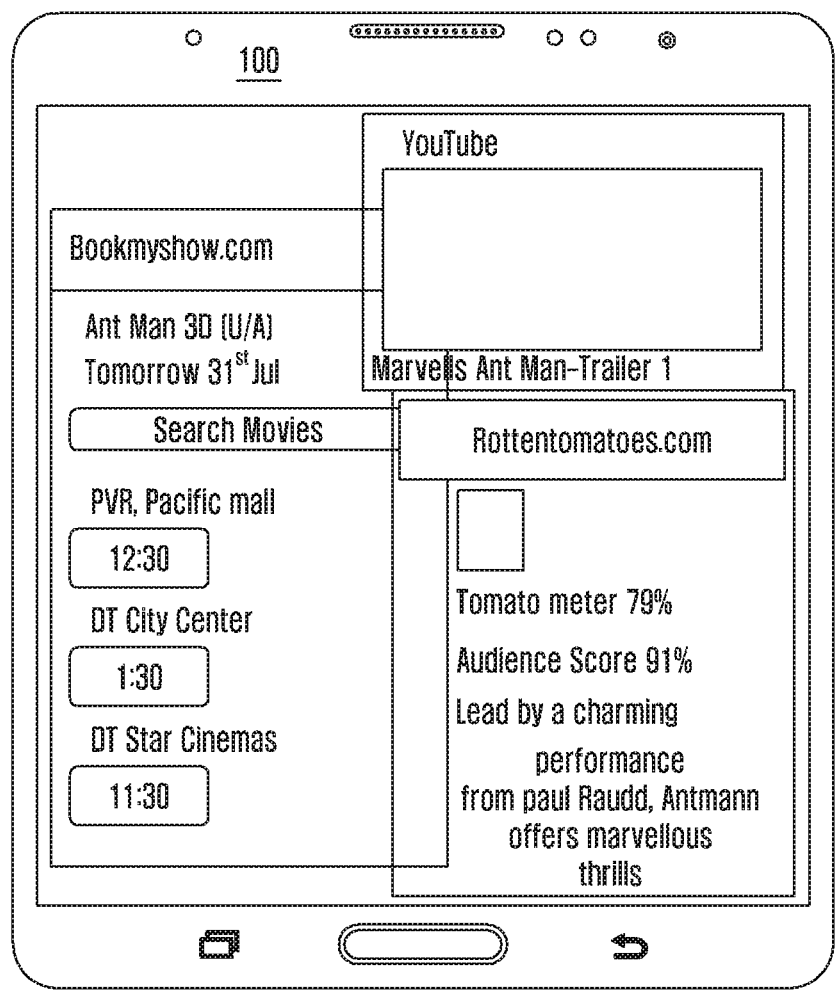
FIGS. 15A and 15B show an example scenario in which an electronic device displays a data item selection list having data items from each application browsed on the electronic device according to various embodiments of the present disclosure.
Figure 15B:
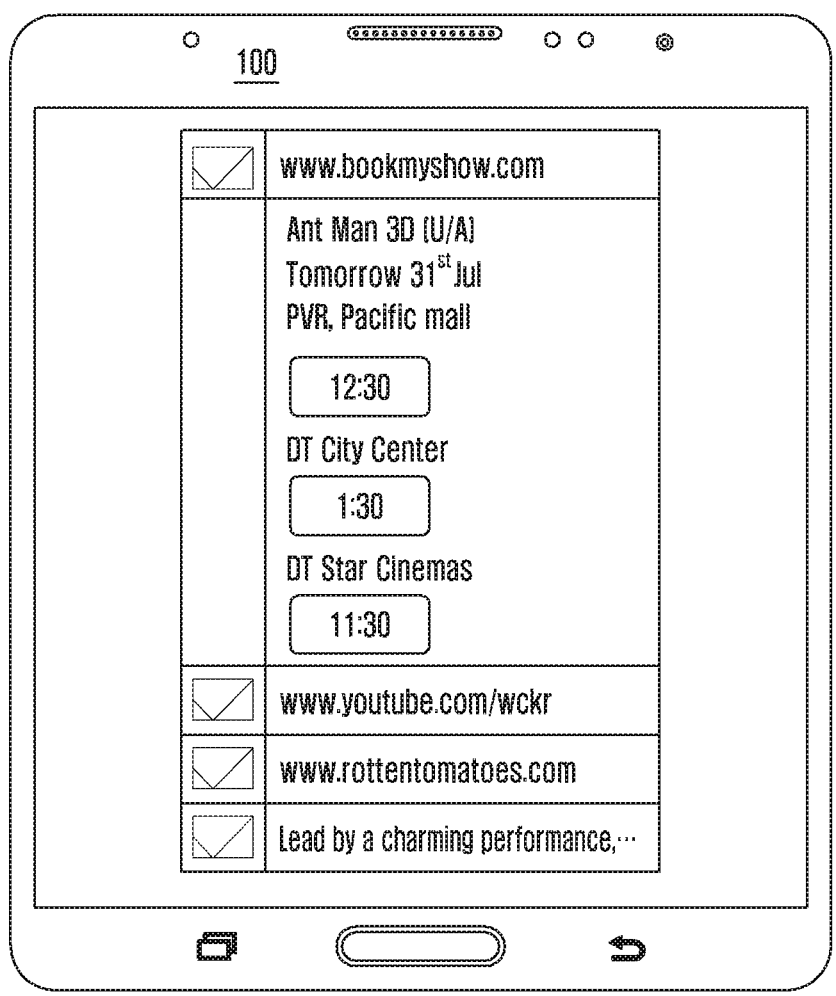

FIGS. 15A and 15B show an example scenario in which an electronic device displays a data item selection list having data items from each application browsed on the electronic device according to various embodiments of the present disclosure.

Referring to FIG. 15A, the electronic device 100 displays three applications windows. A first application window displays a bookmyshow application, a second application window displays a movie trailer in a YouTube™ application and a third application displays a review of a movie in a browser.

The data items (which include content) displayed in each window can be selected by performing the screen grab operation on the electronic device 100. When the screen grab operation is performed on the electronic device 100 the data items from the bookmyshow application (i.e., the content displayed in the bookmyshow application), the trailer of the movie (which is a URL of the content in the YouTube™ application), and review of the movie (i.e., URL in the browser) are grabbed. In an embodiment, a data item selection list is generated with the content displayed in the bookmyshow application, a URL of the movie trailer displayed in the YouTube™ application and a URL displayed in the browser. The data item selection list is displayed on the screen of the electronic device 100 as shown in FIG. 15B. Thus, with a single operation, the user can grab the data items displayed in the three application windows by performing the screen grab operation on the electronic device 100.

Although it is not shown, from FIG. 15A, it should be understood that the user can book tickets from the bookmyshow application and can share the tickets with friends. Unlike methods according to the related art, the content or the data items in the applications browsed by the user can be shared instantly with the single operation of screen grab without undergoing extensive number of operations and thereby improve overall user experience.

Thus, with the proposed method, referring to FIG. 15A, the snapshot of the first application (i.e., bookmyshow), the second application (i.e., YouTube™ application) and the third application (i.e., review of a movie in browser) can be shared instantly by performing the single screen grab operation on the electronic device 100.

A following example depicts another use case scenario for the proposed method. Consider that a user is working on a website through a browser on the electronic device 100. A chat application and a design document are also opened on the electronic device 100. In this scenario, the user can share the data items or content displayed in the website, text from chat application and the content in the design document with a single screen grab operation on the electronic device 100. In an embodiment, a URL in the browser, snapshot of the website, text in the chat application and the design document can be grabbed when the single screen grab operation is performed on the electronic device 100. In an embodiment, the text grabbed from the chat application can be grabbed and shared as a rich text format (RTF) and the design document can be shared as a portable document format (PDF).

Another example scenario of the proposed method is described herein. Consider that a user working in a marketing and search department and the user finds that there are some offers on a product available on three websites. The user can share the screenshot of the three websites by performing the single screen grab on the electronic device 100. In an embodiment, URLs and prices from each website can be grabbed and shared to multiple users collectively or separately.

Figure 16A:
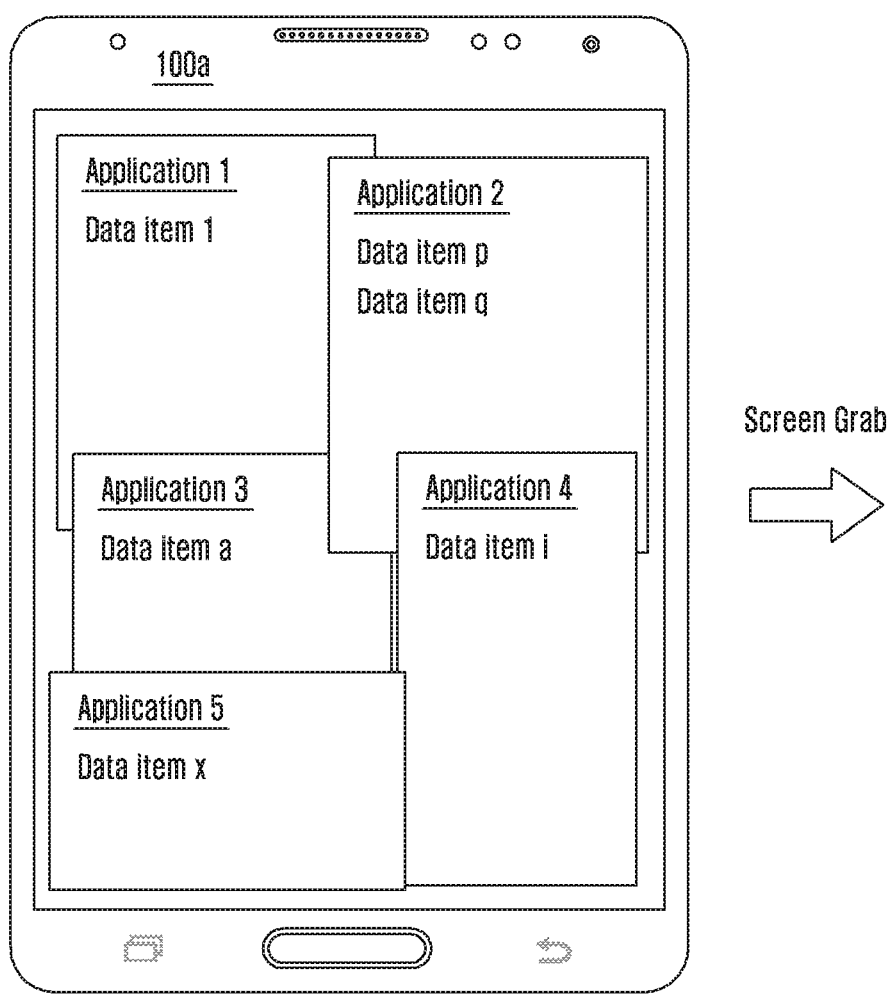
FIGS. 16A to 16C show an example scenario in which multiple electronic devices are connected together to generate a data item selection list having data items grabbed from each application displayed on each electronic device when a screen grab function is activated according to various embodiments of the present disclosure.
Figure 16B:
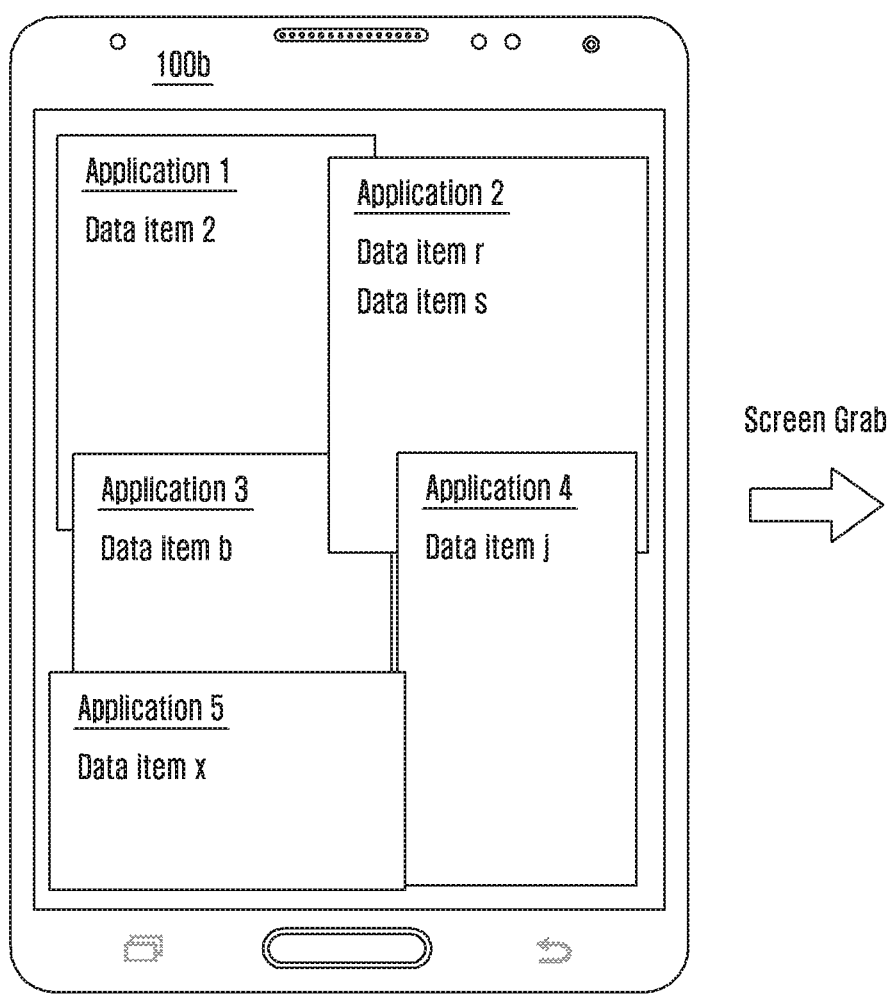
Figure 16C:
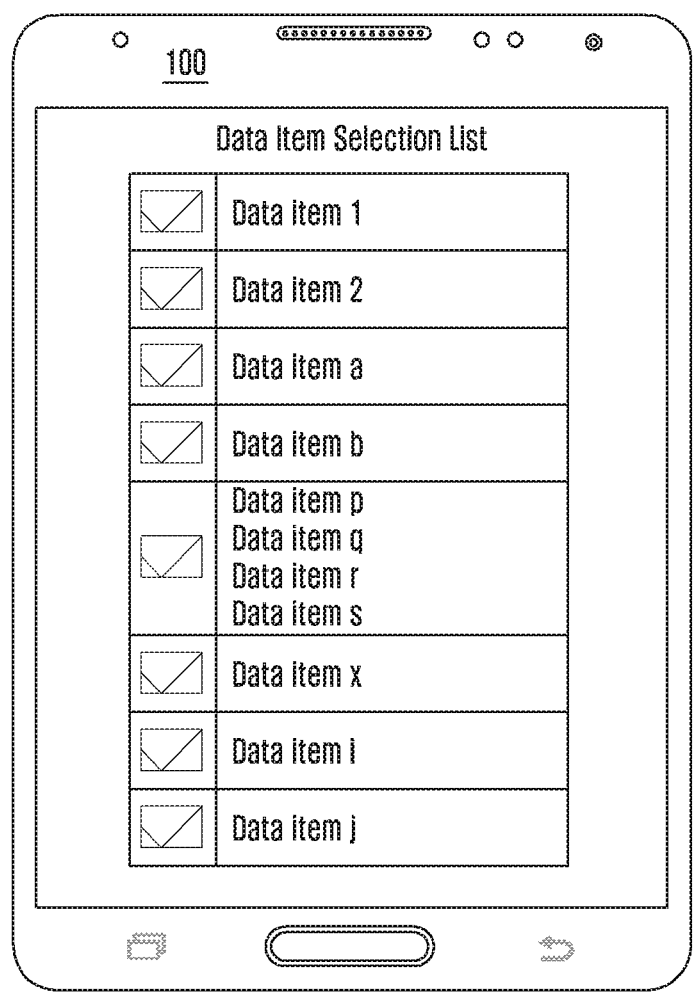

FIGS. 16A to 16C show an example scenario in which multiple electronic devices are connected together to generate a data item selection list having data items grabbed from each application displayed on each electronic device when a screen grab function is activated according to various embodiments of the present disclosure.

Referring to FIGS. 16A and 16B, the screen grab operation can be performed on the electronic devices 100a and 100b respectively. When the screen grab operation is performed on the electronic devices 100a and 100b, the data items are grabbed from the plurality of applications displayed in the electronic device 100a and the electronic device 100b respectively. In an embodiment, the electronic device 100a generates the data item selection list from the data items grabbed from the plurality of applications displayed in the electronic device 100a. In an embodiment, the electronic device 100b generates the data item selection list from the data items grabbed from the plurality of applications displayed in the electronic device 100b.

The electronic device 100a and the electronic device 100b send the generated data item selection list to the electronic device 100. The electronic device 100 displays the data item selection list (which includes the data item selection received from the electronic device 100a and 100b) received from the electronic device 100a and the electronic device 100b as shown in FIG. 16C.

Although FIGS. 1A, 1B, 2, 3, 4A to 4D, 5A to 5E, 6A, 6B, 7A to 7C, 8A, 8B, 9A to 9C, 10A, 10B, 11A, 11B, 12A to 12C, 13A, 13B, 14A, 14B, 15A, and 15B describe the screen grab method for multiple data items selection using a single operation on a single electronic device, it is to be understood that the other embodiments are not limited thereon. A person having ordinarily skill in the art can quick identity that the screen grab method can be easily implemented on a group of devices connected together in network. FIGS. 17, 18, 19A, and 19B describe some examples thereon.

Figure 17:
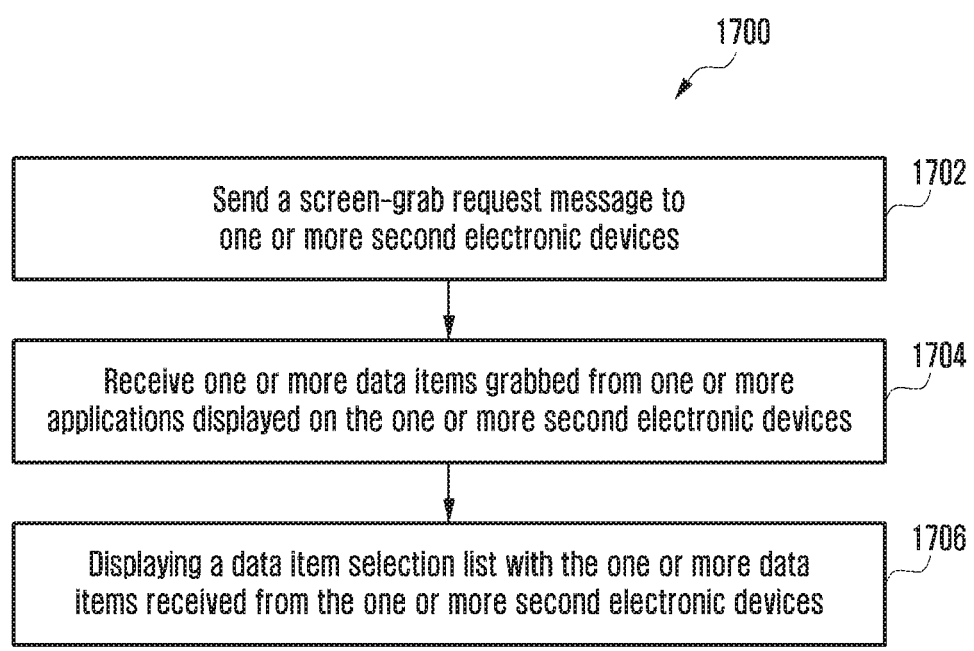
FIG. 17 is a flow chart illustrating a method for selecting multiple data items from a plurality of electronic devices according to an embodiment of the present disclosure.

FIG. 17 is a flow chart illustrating a method for selecting multiple data items from a plurality of electronic devices according to an embodiment of the present disclosure.

At operation 1702, the method 1700 includes sending the screen grab request message to the second electronic devices 100a-100n. The method 1300 allows the controller unit 210 to send the screen grab request message to the second electronic devices 100a-100n. At operation 1704, the method 1700 includes receiving the data items grabbed from the one or more applications displayed on the second electronic devices 100a-100n. The method 1700 allows the controller unit 210 to receive the data items grabbed from the applications displayed on the second electronic devices 100a-100n.

At operation 1706, the method 1700 includes displaying a data item selection list with the one or more data items received from the second electronic devices 100a-100n. The method 1700 allows the controller unit 210 to display the data item selection list with the data items received from the second electronic devices 100a-100n.

The various actions, acts, blocks, operations, or the like in the method 1700 may be performed in the order presented, in a different order or simultaneously. Further, in some embodiments, some of the actions, acts, blocks, operations, or the like may be omitted, added, modified, skipped, or the like without departing from the scope of the present disclosure.

Figure 18:
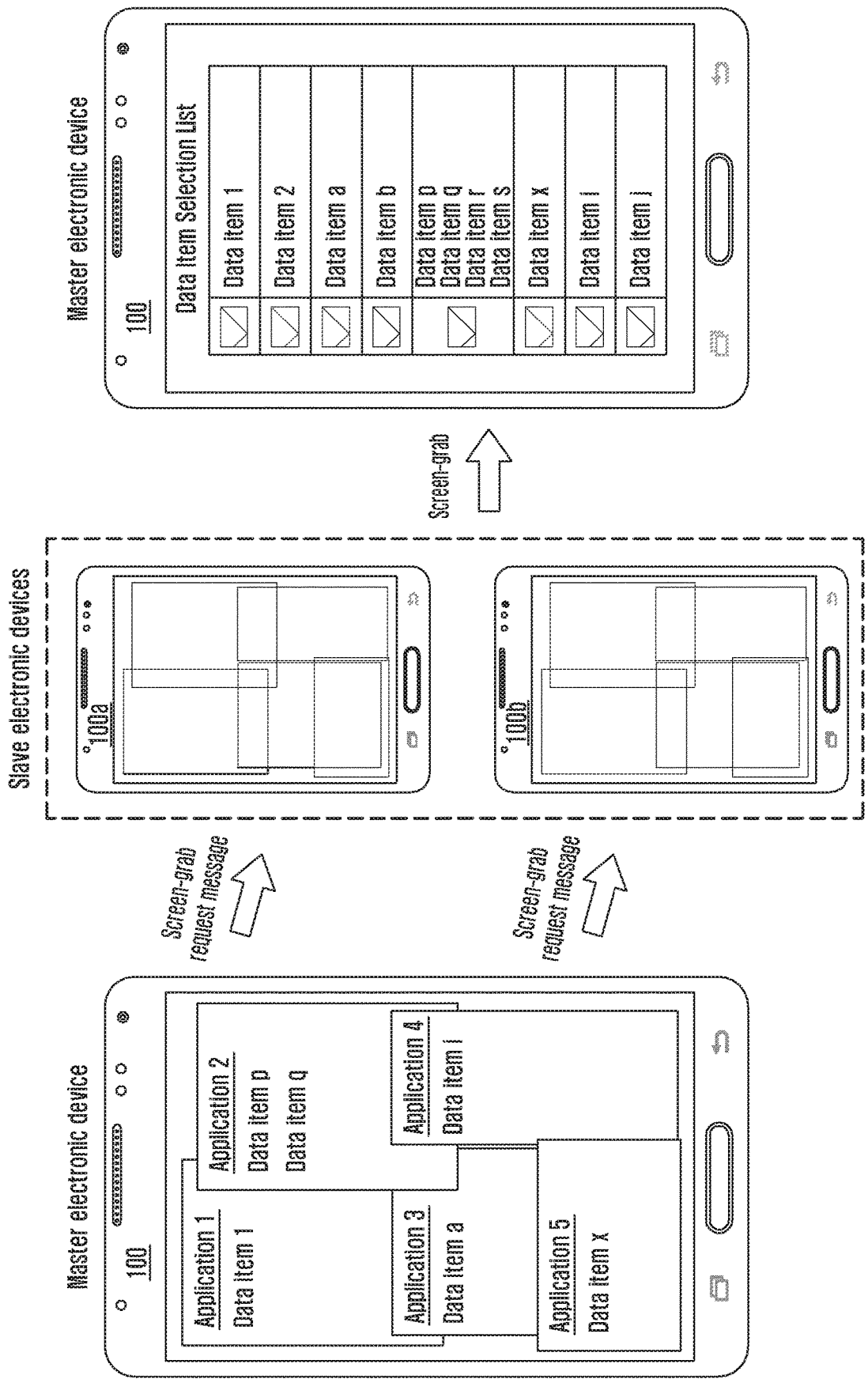
FIG. 18 illustrates an example scenario in which a data item selection list has data items grabbed from multiple electronic devices connected to each other according to an embodiment of the present disclosure.

FIG. 18 illustrates an example scenario in which a data item selection list having data items grabbed from multiple electronic devices connected to each other according to an embodiment as disclosed herein.

Referring to FIG. 18, the proposed method can be extended to grab multiple data items from different electronic devices connected together in a network. The electronic devices are connected together forming a network in which one among the electronic devices acts as a master electronic device 100 and remaining electronic devices act as slave electronic devices 100a and 100b. For example, one or more slave electronic devices are connected to a master electronic device.

In order to perform the screen grab operation on slave electronic devices, referring to FIG. 18, the master electronic device 100 sends a screen grab request message to the slave electronic devices 100a and 100b. The slave electronic devices 100a and 100b perform the screen grab operation in response to the screen grab request message received from the master electronic device 100. Further, each of the slave electronic devices (which receive the screen grab request message) generates a data item selection list after receiving the screen grab request message and sends the generated data item selection list to the master electronic device 100. The master electronic device 100 receives the data item selection list from each of the slave electronic devices (i.e., 100a and 100b) and generates a combined data item selection list.

A following use case scenario for grabbing the data items displayed in the plurality of applications on multiple electronic devices is described herein. When a team of members are collectively working on a project, a team member can send a screen grab request message through the master electronic device 100 to the remaining team members. The remaining team members receive the screen grab request on their respective electronic devices. Each team member can perform the screen grab operation after receiving the screen-grab request message from the master electronic device 100. In response to the screen grab operation, each of the slave electronic devices generates a data item selection list. Further, the data item selection list, generated at each of the slave electronic devices, is shared with the master electronic device 100. Thus, the master electronic device 100 receives the data item selection list from each of the slave electronic devices and combines each data item selection list to generate a combined data item selection list.

In another use case scenario, consider that a team of members are collaboratively browsing on their electronic devices. A screen-grab request message can be sent from the electronic device 100 (which is a master electronic device) to the electronic devices which are connected with the electronic device 100. Each slave electronic device receives the screen grab request message. A screen grab operation is performed on each of the slave electronic devices to grab the data item displayed thereon. The grabbed information at each of the slave electronic devices can be shared with the master electronic device 100. Thus, with the proposed method, users can collectively browse and can share the content among each other by performing a screen grab operation.

Figure 19A:
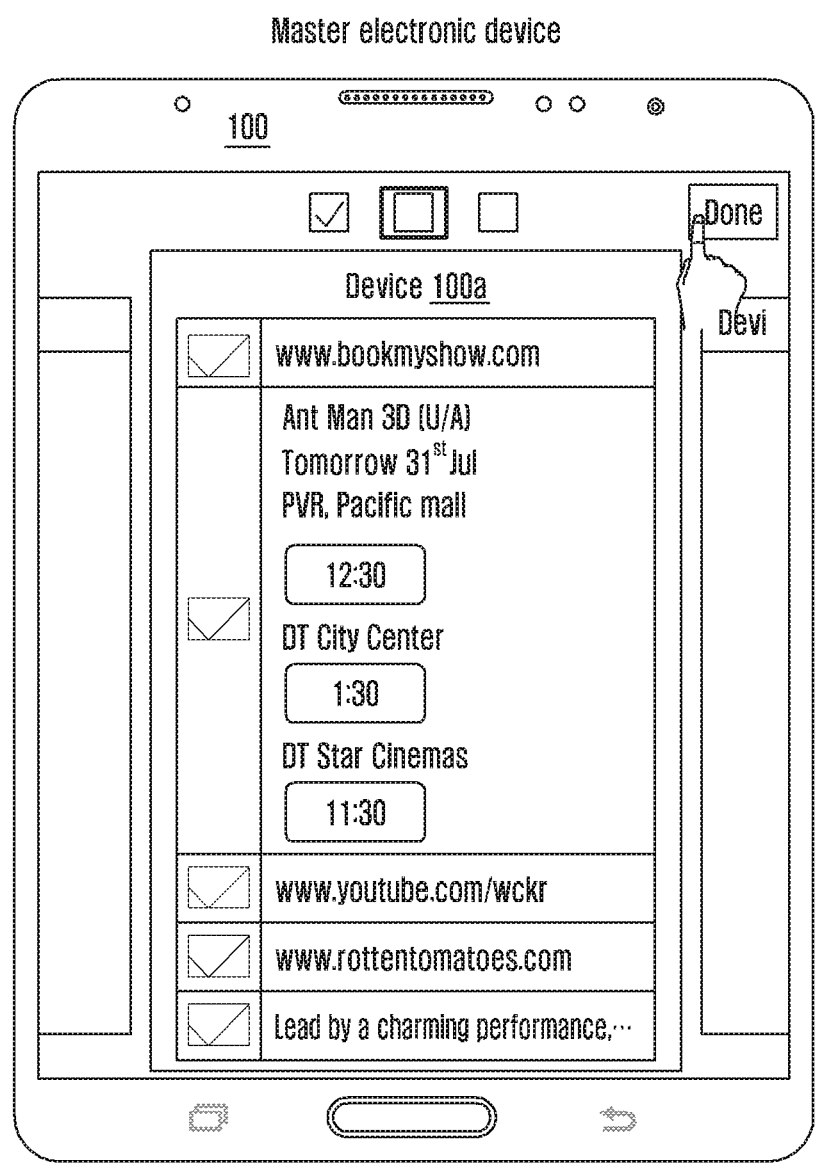
FIGS. 19A and 19B illustrate an example scenario in which an electronic device displays a data item selection list received from multiple electronic devices according to various embodiments of the present disclosure.
Figure 19B:
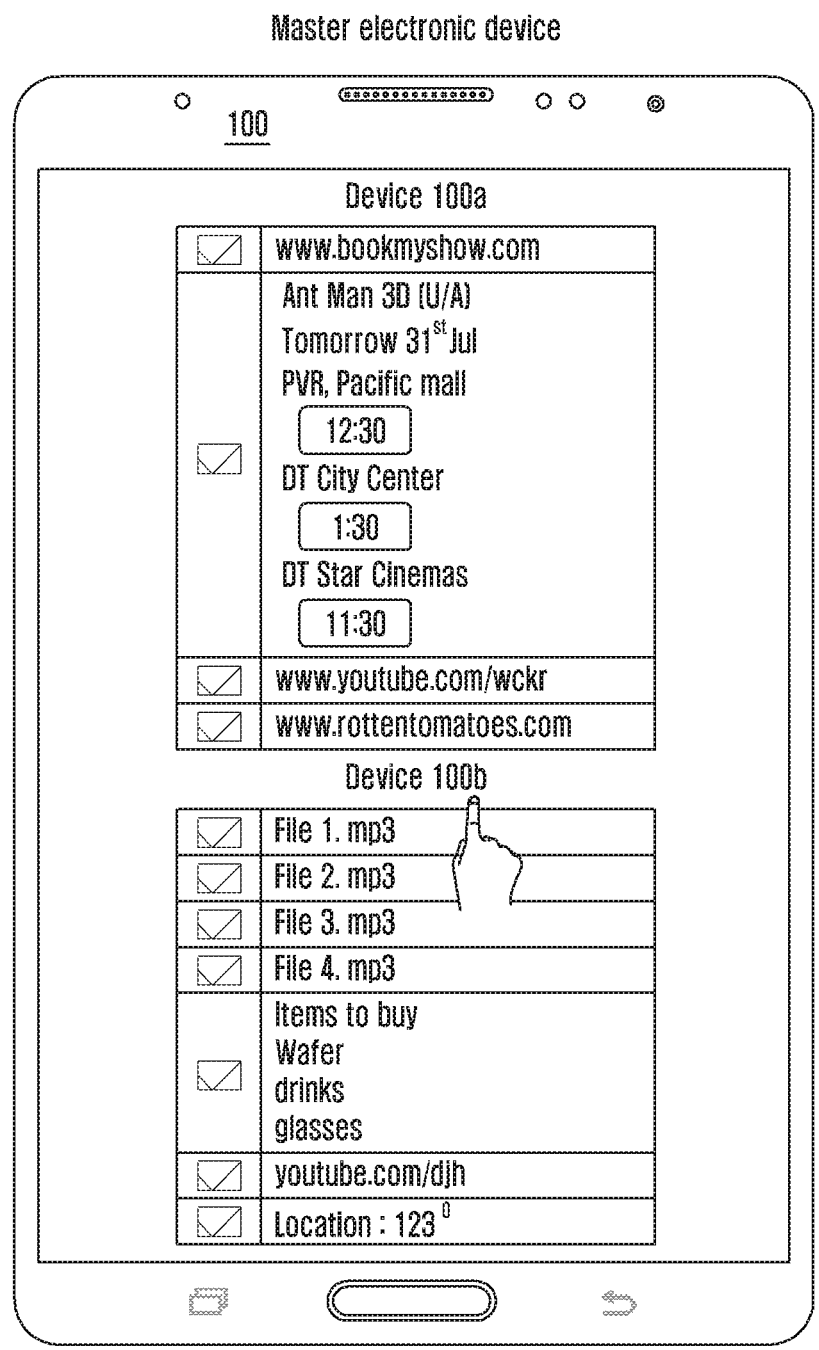

FIGS. 19A and 19B illustrate an example scenario in which a master electronic device displays a data item selection list received from multiple slave electronic devices according to various embodiments of the present disclosure.

Referring to FIG. 19A, each of the data item selection lists, received from each of the slave electronic devices (i.e., the electronic device 100*a* and the electronic device 100*b*) is displayed on the screen of the master electronic device 100. The data item selection list received from the slave electronic devices can be swiped to view or to edit the data item selection list. Further, the data items in each data item selection list can be selected or de-selected. After selecting or de-selecting the data items in the data item selection list, a "done" button can be clicked. When the "done" button is clicked, a combined data item selection list (which includes the data item selection list received from each of the slave electronic devices) is displayed on the screen of the master electronic device 100 as shown in FIG. 19B. The combined data item selection list is displayed with a device name from where the data item selection list is received.

The device name (displayed in the data item selection list) can be tapped to view each data item selection list as shown in FIG. 19B. When tapped on the device name, each data item selection list is displayed on the screen of the electronic device 100 as shown in FIG. 19A.

Although the above description provides a limited overview of the actions and features of the present disclosure, it is to be understood that other embodiments are not limited thereon. For example, a list of recently accessed items from various application can be captured using a single screen grab operation. In another example, the selected item(s) can deleted, shuffled, prioritized, and the like.

Further, with the proposed method, the screen-grab operation can be performed for selecting the data items from a recent applications window in case the electronic device 100 doesn't support multi-window. When the screen-grab operation is performed on the recent applications window, automatically the most recent applications are relaunched one by one and the screenshot for each application is captured. From the screenshot the content is fetched and displayed to the user.

When the screen of the recent applications window is grabbed by performing the screen grab operation on the electronic device 100, the user can select a starting point by selecting an application from the recent applications list by either dragging the application such that the application is on the vertical center or some other way (e.g., selecting the application). From the selected application to the most recent application, the data items in each application can be grabbed.

Figure 20:
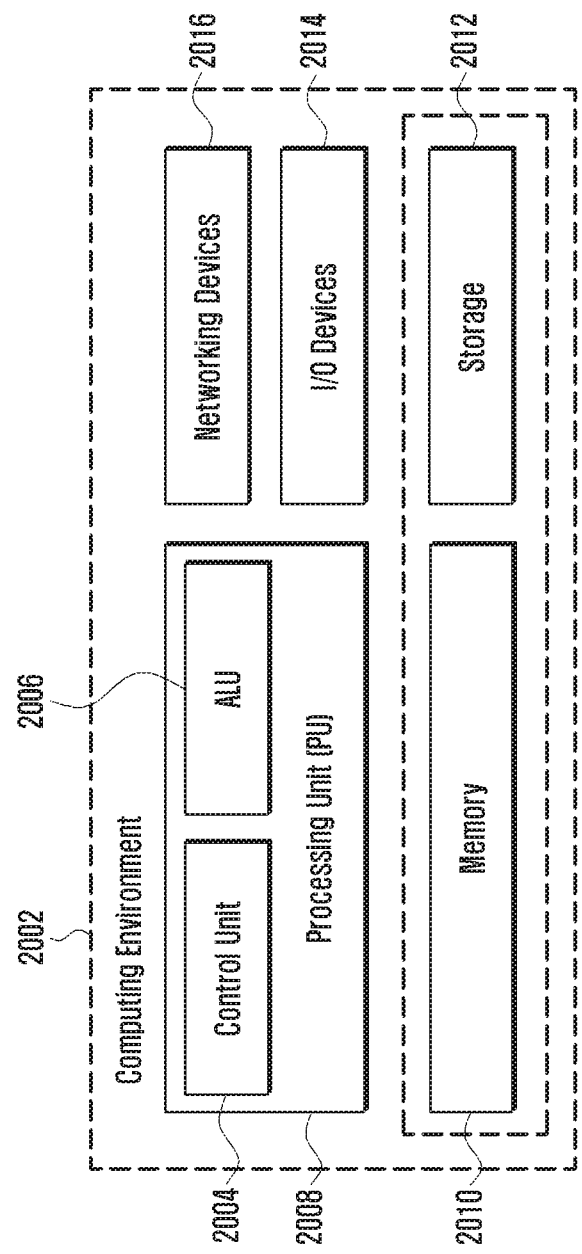
FIG. 20 illustrates a computing environment implementing a screen grab method for multiple data items selection using a single operation in an electronic device according to an embodiment of the present disclosure.

FIG. 20 illustrates a computing environment implementing a method for selecting data items in an electronic device according to an embodiment of the present disclosure.

Referring to FIG. 20, the computing environment 2002 comprises at least one processing unit 2008 that is equipped with a control unit 2004 and an arithmetic logic unit (ALU) 2006, a memory 2010, a storage 2012, a plurality of networking devices 2016 and a plurality of input/output (I/O) devices 2014. The processing unit 2008 is responsible for processing the instructions of the technique. The processing unit 1608 receives commands from the control unit in order to perform its processing. Further, any logical and arithmetic operations involved in t execution of the instructions are computed with the help of the ALU 2006.

The overall computing environment 2002 can be composed of multiple homogeneous and/or heterogeneous cores, multiple computer processing units (CPUs) of different kinds, special media and other accelerators. The processing unit 1608 is responsible for processing the instructions of the technique. Further, the plurality of processing units 2008 may be located on a single chip or over multiple chips.

The technique comprising instructions and codes required for the implementation are stored in either the memory 2010 or the storage 2012 or both. At the time of execution, the instructions may be fetched from the corresponding memory 2010 or storage 2012, and executed by the processing unit 2008.

In case of any hardware implementations, various networking devices 2016 or external I/O devices 2014 may be connected to the computing environment to support the implementation through a networking unit and an I/O device unit.

The embodiments disclosed herein can be implemented through at least one software program running on at least one hardware device and performing network management functions to control the elements. The elements shown in FIGS. 1A, 1B, 2, 3, 4A to 4D, 5A to 5E, 6A, 6B, 7A to 7C, 8A, 8B, 9A to 9C, 10A, 10B, 11A, 11B, 12A to 12C, 13A, 13B, 14A, 14B, 15A, 15B, and 16A to 16C include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for displaying multiple data items in an electronic device, the method comprising:

displaying, by the electronic device, a plurality of applications including a first application and a second application on a screen of the electronic device, wherein the first application includes at least one data item and the second application includes at least one data item;

based on a screen grab function being activated by detecting a predetermined event:

identifying, by the electronic device, the at least one data item included in the first application and the at least one data item included in the second application, and displaying, by the electronic device, a list including the at least one data item included in the first application and the at least one data item included in the second application, wherein the list includes a selection function for the at least one data item included in the first application and the at least one data item included in the second application;

receiving a user input, on the list, for selecting the at least one data item included in the first application and the at least one data item included in the second application; and sending the selected at least one data item included in the first application and the selected at least one data item included in the second application to another electronic device.

2. The method of claim 1, wherein the displaying of the list including the at least one data item included in the first application and the at least one data item included in the second application comprises displaying the list including text information of the at least one data item included in the first application and the at least one data item included in the second application.

3. The method of claim 1, further comprising:
assigning, by the electronic device, the plurality of applications to at least one group; and
displaying at least one application of a same group with a same graphical effect.

4. The method of claim 1, further comprising:
displaying, by the electronic device, a first data item and a second data item of the at least one data item included in the first application in a same first group with a same first graphical effect; and
displaying, by the electronic device, a third data item and a fourth data item of the at least one data item included in the second application in a same second group with a same second graphical effect.

5. The method of claim 1, wherein the sending of the selected at least one data item included in the first application comprises sending coordinate information in a displayed application of the at least one data item included in the first application to the other electronic device.

6. The method of claim 1, wherein the screen grab function is activated when one of a predetermined input is received or a request of a screen grab is received from the other electronic device.

7. The method of claim 1, further comprising:
displaying, by the electronic device, the first application, the second application, and a third application; and
receiving an application selection by a user of the first application and the second application, without selection of the third application,
wherein, in response to the selection of the first application and the second application, the displaying of the list is performed, and
wherein the third application includes a data item that is not displayed in the list.

8. An electronic device comprising:
a display;
a communicator configured to communicate with at least one other electronic device;
at least one processor; and
at least one memory storing one or more computer programs, including instructions configured to be executed by the at least one processor, wherein the one or more computer programs include instructions to at least:

cause the display to display a plurality of applications including a first application and a second application on a screen of the electronic device, wherein the first application includes at least one data item and the second application includes at least one data item, based on a screen grab function being activated by detecting a predetermined event:
identify the at least one data item included in the first application and the at least one data item included in the second application; and
cause the display to display a list including the at least one data item included in the first application and the at least one data item included in the second application, wherein the list includes a selection function for the at least one data item included in the first application and the at least one data item included in the second application, receive a user input, on the list, for selecting the at least one data item included in the first application and the at least one data item included in the second application, and send, using the communicator, the selected at least one data item included in the first application and the selected at least one data item included in the second application to the at least one other electronic device.

9. The electronic device of claim 8, wherein the one or more computer programs further include instructions to cause the display to display the list including text information of the at least one data item included in the first application and text information of the at least one data item included in the second application.

10. The electronic device of claim 8, wherein the one or more computer programs further include instructions to control the at least one processor to:
assign the plurality of applications to at least one group, and
cause the display to display at least one application of a same group with a same graphical effect.

11. The electronic device of claim 8, wherein the one or more computer programs further include instructions to at least one of:
cause the display to display a first data item and a second data item of the at least one data item included in the first application in a same first group with a same first graphical effect, or
cause the display to display a third data item and a fourth data item of the at least one data item included in the second application in a same second group with a same second graphical effect.

12. The electronic device of claim 8, wherein the one or more computer programs further include instructions to cause the at least one processor to send coordinate information in a displayed application of the at least one data item included in the first application to the at least one other electronic device.

13. The electronic device of claim 8, wherein the screen grab function is activated when one of a predetermined input signal or a request of a screen grab is-being received from the at least one other electronic device.

* * * * *